United States Patent
Kwon et al.

(10) Patent No.: US 11,856,509 B2
(45) Date of Patent: Dec. 26, 2023

(54) ELECTRONIC DEVICE AND METHOD FOR SEARCHING FOR RADIO ACCESS TECHNOLOGY (RAT) BY ELECTRONIC DEVICE SUPPORTING PLURALITY OF COMMUNICATION NETWORKS

(71) Applicant: SAMSUNG ELECTRONICS CO., LTD., Suwon-si (KR)

(72) Inventors: Yongbeom Kwon, Suwon-si (KR); Sungmi Kim, Suwon-si (KR); Hyunchul Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 5 days.

(21) Appl. No.: 17/210,990

(22) Filed: Mar. 24, 2021

(65) Prior Publication Data

US 2021/0314859 A1 Oct. 7, 2021

(30) Foreign Application Priority Data

Apr. 1, 2020 (KR) .......... 10-2020-0039693

(51) Int. Cl.
*H04W 48/18* (2009.01)
*H04W 8/18* (2009.01)

(52) U.S. Cl.
CPC .......... *H04W 48/18* (2013.01); *H04W 8/183* (2013.01)

(58) Field of Classification Search
CPC ..... H04W 48/18; H04W 8/183; H04W 48/16; H04W 88/06
See application file for complete search history.

(56) References Cited

U.S. PATENT DOCUMENTS

| 10,462,646 B2 | 10/2019 | Berionne et al. |
| 2009/0143023 A1 | 6/2009 | Kim |

(Continued)

FOREIGN PATENT DOCUMENTS

| CN | 110868711 A | 3/2020 |
| KR | 10-0606737 | 7/2006 |

(Continued)

OTHER PUBLICATIONS

International Search Report and Written Opinion dated Jul. 7, 2021 in corresponding International Application No. PCT/KR2021/003997.

(Continued)

*Primary Examiner* — Marcus Hammonds
(74) *Attorney, Agent, or Firm* — Nixon & Vanderhye P.C.

(57) ABSTRACT

According to various embodiments, an electronic device may include: at least one antenna module including at least one antenna; a universal integrated circuit card (UICC) configured to store at least one piece of subscriber identity information; and at least one processor electrically connected to the UICC, wherein the at least one processor may be configured to: receive a request to initialize a subscriber identity module (SIM) stored in the UICC; identify whether the UICC includes information about a list of a wireless communication network service to which a user subscribes; and in response to identifying that the UICC including the information about the list of the wireless communication network service to which the user subscribes, control the electronic device to perform wireless communication network connection through the at least one antenna module based on the information about the list of the wireless communication network service to which the user subscribes being included in the UICC.

18 Claims, 15 Drawing Sheets

(56) References Cited

U.S. PATENT DOCUMENTS

| | | | |
|---|---|---|---|
| 2011/0003590 A1* | 1/2011 | Yoon | H04W 36/385 |
| | | | 455/552.1 |
| 2013/0023235 A1 | 1/2013 | Fan et al. | |
| 2015/0289114 A1 | 10/2015 | Dandra et al. | |
| 2015/0319602 A1 | 11/2015 | Tagg et al. | |
| 2015/0349825 A1* | 12/2015 | Lee | H04L 63/0853 |
| | | | 455/558 |
| 2016/0219556 A1 | 7/2016 | Kim et al. | |
| 2018/0109676 A1* | 4/2018 | Yeoum | H04M 3/42136 |
| 2019/0281442 A1* | 9/2019 | Kim | H04W 8/205 |
| 2019/0342943 A1* | 11/2019 | Rice | H04B 1/0053 |
| 2020/0053642 A1* | 2/2020 | Huang-Fu | H04W 8/183 |
| 2020/0084741 A1 | 3/2020 | Chun et al. | |
| 2021/0204203 A1 | 7/2021 | Lee et al. | |

FOREIGN PATENT DOCUMENTS

| | | |
|---|---|---|
| KR | 10-2015-0115675 | 10/2015 |
| KR | 10-2015-0129412 | 11/2015 |
| KR | 10-2016-0134439 | 11/2016 |
| WO | WO 2012/102862 A1 | 8/2012 |
| WO | WO 2017/027126 A1 | 2/2017 |
| WO | WO 2017/185270 A1 | 11/2017 |
| WO | WO 2020/027428 A1 | 2/2020 |

OTHER PUBLICATIONS

European Examination Report dated May 22, 2023 for EP Application No. 21779089.8.
European Search Report dated Sep. 20, 2023 for EP Application No. 21779089.8.

* cited by examiner

ELECTRONIC DEVICE AND METHOD FOR SEARCHING FOR RADIO ACCESS TECHNOLOGY (RAT) BY ELECTRONIC DEVICE SUPPORTING PLURALITY OF COMMUNICATION NETWORKS

CROSS-REFERENCE TO RELATED APPLICATION

This application is based on and claims priority under 35 U.S.C. 119 to Korean Patent Application No. 10-2020-0039693, filed on Apr. 1, 2020, in the Korean Intellectual Property Office, the disclosure of which is incorporated by reference herein in its entirety.

BACKGROUND

Field

The disclosure relates to an electronic device and a method for searching for radio access technology (RAT) by an electronic device supporting a plurality of communication networks.

Description of Related Art

As portable terminals providing various functions are widely used due to the recent development of mobile communication technology, efforts are being made to develop a 5G communication system in order to meet the increasing demand for wireless data traffic. To achieve a high data transmission rate, implementation of a 5G communication system in a mmWave band (e.g., a 25 to 60 GHz band) in addition to a high-frequency band used in a 3G communication system and a long-term evolution (LTE) communication system is being considered in order to provide a high data transmission speed.

To alleviate the path loss of radio signals and to increase the transmission distance of radio signals in a mmWave band, beamforming, massive multiple-input multiple-output (massive MIMO), full-dimensional MIMO (FD-MIMO), array antenna, analog beamforming, and large-scale antenna techniques are under discussion for implementation in a 5G communication system.

To implement 5G communication, a stand-alone (SA) mode and a non-stand-alone (NSA) mode are being considered. The SA mode may be a method using only a new radio (NR) system, and the NSA mode may be a method using the NR system together with an existing LTE system. In the NSA mode, a user terminal may use not only an eNB of the LTE system but also a gNB of the NR system. A technology that enables a user terminal to use heterogeneous communication systems may be referred to as dual connectivity.

An electronic device supporting a legacy network (e.g., a long-term evolution (LTE) network) may operate to search for a signal from a base station according to a radio access technology (RAT) search order preset by the electronic device in order to search for a base station of a 2G network, a node B of a 3G network, an eNB of a 4G network, and a gNB of a 5G network before registering in the legacy network.

An electronic device supporting a plurality of communication networks may attempt frequency scanning for all supported RATs. For example, an electronic device supporting a 5G stand-alone (SA) communication mode may attempt unnecessary frequency scanning for a 5G RAT even though not subscribing to a 5G communication service. When a gNB of a 5G network is found during frequency scanning, the electronic device may attempt unnecessary 5G network registration in a found frequency. In this case, the electronic device may spend unnecessary time registering in a specific communication network service or reconnecting to a different communication network service.

SUMMARY

Embodiments of the disclosure provide an electronic device and a method for searching for RAT by an electronic device supporting a plurality of communication networks which do not search for a wireless communication network to which a user does not subscribe by identifying information about a list of a wireless communication network service to which the user subscribes upon request to initialize a subscriber identity module (SIM) operating in the electronic device.

Embodiments of the disclosure provide an electronic device and a method for searching for RAT by an electronic device supporting a plurality of communication networks which do not search for a wireless communication network to which a user does not subscribe by identifying information about a list of a wireless communication network service to which the user subscribes in the occurrence of an event of connection to a specific wireless communication network.

According to various example embodiments, an electronic device may include: at least one antenna module including at least one antenna; a universal integrated circuit card (UICC) configured to store at least one piece of subscriber identity information; and at least one processor electrically connected to the UICC, wherein the at least one processor may be configured to: receive a request to initialize a subscriber identity module (SIM) stored in the UICC; identify whether the UICC includes information about a list of a wireless communication network service to which a user subscribes; and in response to identifying that the UICC includes the information about the list of the wireless communication network service to which the user subscribes, control the electronic device to perform wireless communication network connection through the at least one antenna module based on the information about the list of the wireless communication network service to which the user subscribes being included in the UICC.

According to various example embodiments, a method for searching for a radio access technology (RAT) by an electronic device supporting a plurality of communication networks may include: receiving a request to initialize a subscriber identity module (SIM) stored in a universal integrated circuit card (UICC); identifying whether the UICC includes information about a list of a wireless communication network service to which a user subscribes; and in response to identifying that the UICC includes the information about the list of the wireless communication network service to which the user subscribes, performing wireless communication network connection through at least one antenna module based on the information about the list of the wireless communication network service to which the user subscribes being included in the UICC.

According to various example embodiments, an electronic device may include: at least one antenna module including at least one antenna; a universal integrated circuit card (UICC) configured to store at least one piece of subscriber identity information; and at least one processor electrically connected to the UICC, wherein the at least one processor may be configured to: identify occurrence of an event of connection to a second wireless communication network while being connected to a first wireless communication network through the at least one antenna module; identify whether the UICC includes information about a list of a wireless communication network service to which a user subscribes; in response to identifying that the UICC includes the information about the list of the wireless communication network service to which the user subscribes, identify whether the user subscribes to a wireless network communication service corresponding to the second wireless communication network based on the information about the list of the wireless communication network service to which the user subscribes being included in the UICC; and control the electronic device to perform connection with the second wireless communication network through the at least one antenna module based on whether the user subscribes to the wireless network communication service corresponding to the second wireless communication network.

According to various example embodiments, a method for searching for a radio access technology (RAT) by an electronic device supporting a plurality of communication networks may include: identifying occurrence of an event of connection to a second wireless communication network while being connected to a first wireless communication network through at least one antenna module; identifying whether a universal integrated circuit card (UICC) includes information about a list of a wireless communication network service to which a user subscribes; in response to identifying that the UICC includes the information about the list of the wireless communication network service to which the user subscribes, identifying whether the user subscribes to a wireless network communication service corresponding to the second wireless communication network based on the information about the list of the wireless communication network service to which the user subscribes being included in the UICC; and performing connection with the second wireless communication network through the at least one antenna module based on whether the user subscribes to the wireless network communication service corresponding to the second wireless communication network.

According to various example embodiments. a search for a wireless communication network to which a user does not subscribe may not be performed by identifying information about a list of a wireless communication network service to which the user subscribes upon request to initialize a SIM, thereby reducing time unnecessarily used to connect to and register in a specific network service or to reconnect to the service.

According to various example embodiments. a search for a wireless communication network to which a user does not subscribe may not be performed by identifying information about a list of a wireless communication network service to which the user subscribes in the occurrence of an event of connection to a specific wireless communication network, thereby reducing time unnecessarily used to connect to and register in a specific network service or to reconnect to the service.

Accordingly, it is possible to reduce time and current (e.g., power) consumption for access to communication network, and an unnecessary authentication process for the communication network to which a user does not subscribe may not be performed, thus reducing load for the communication network.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
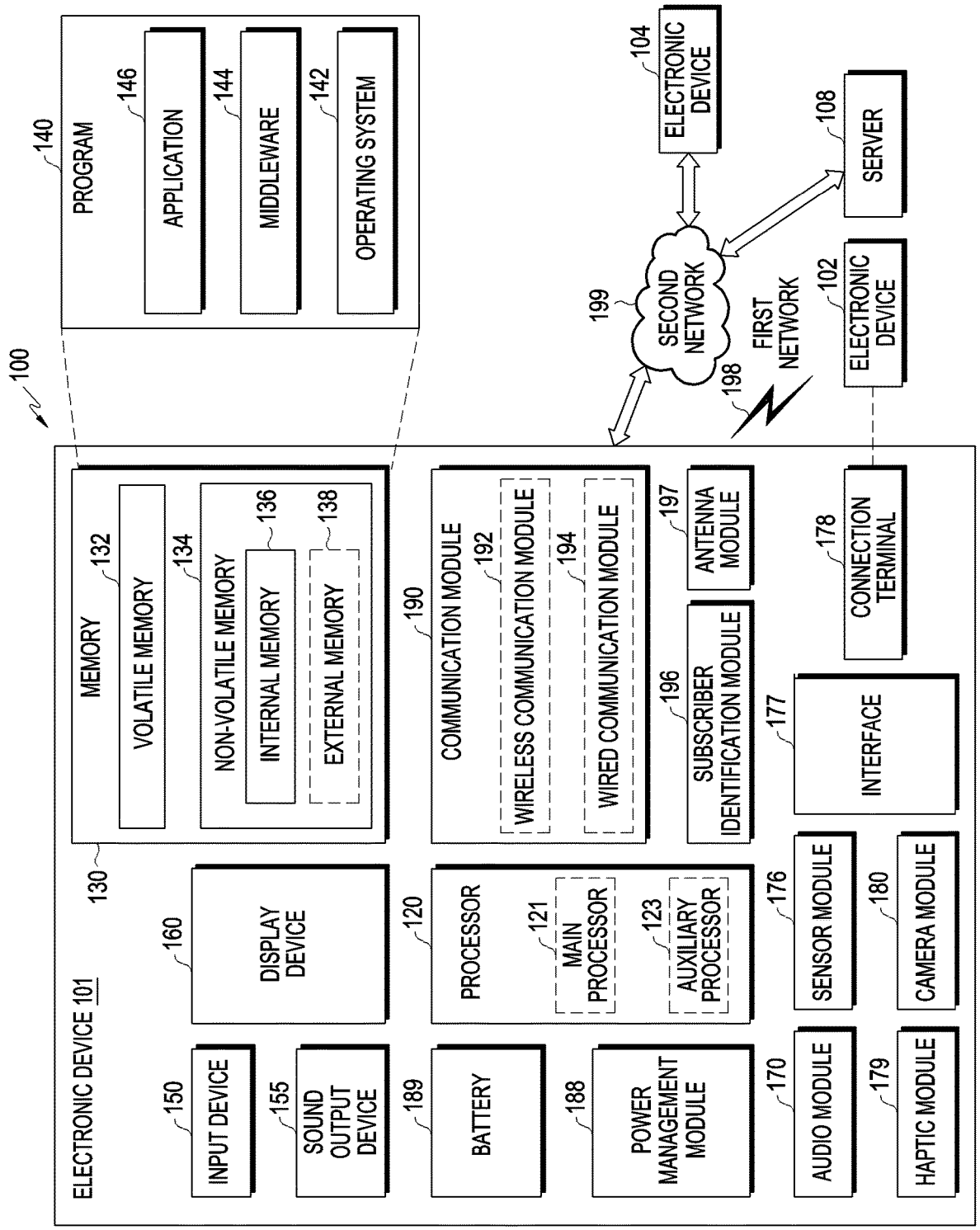
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
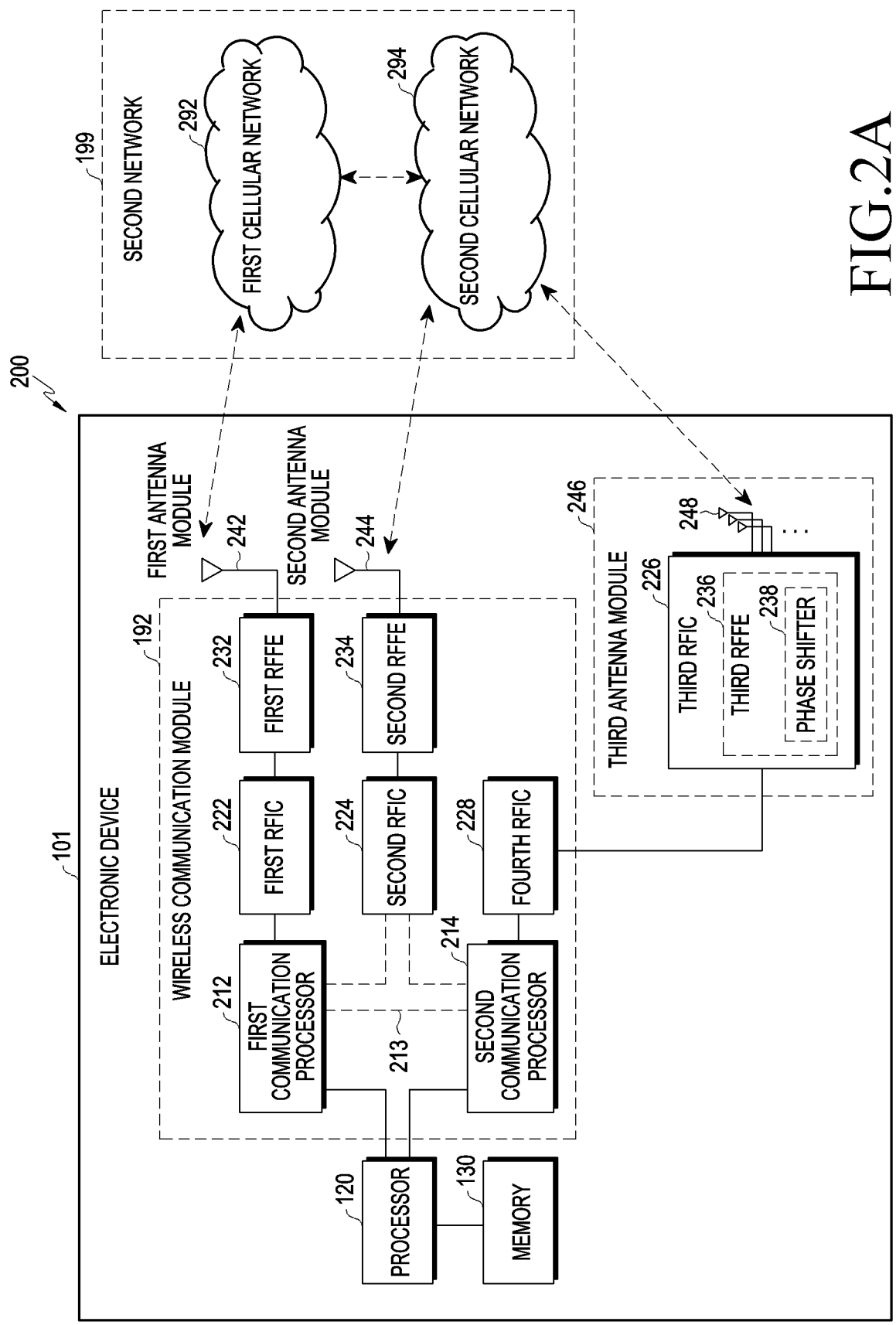
FIG. 2A is a block diagram illustrating an example electronic device for supporting communication via a legacy network and communication via a 5G network according to various embodiments.

FIG. 2A is a block diagram 200 illustrating an example electronic device 101 supporting communication via a legacy network and communication via a 5G network according to various embodiments. Referring to FIG. 2A, the electronic device 101 may include a first communication processor (e.g., including processing circuitry) 212, a second communication processor (e.g., including processing circuitry) 214, a first radio-frequency integrated circuit (RFIC) 222, a second RFIC 224, a third RFIC 226, a fourth RFIC 228, a first radio-frequency front end (RFFE) 232, a second RFFE 234, a first antenna module 242, a second antenna module 244, and an antenna 248. The electronic device 101 may further include a processor (e.g., including processing circuitry) 120 and a memory 130. A network 199 may include a first network 292 and a second network 294. According to another embodiment, the electronic device 101 may further include at least one of the components illustrated in FIG. 1, and the network 199 may further include at least one different network. According to an embodiment, the first communication processor 212, the second communication processor 214, the first RFIC 222, the second RFIC 224, the fourth RFIC 228, the first RFFE 232, and the second RFFE 234 may form at least part of a wireless communication module 192. According to another embodiment, the fourth RFIC 228 may be omitted or may be included as part of the third RFIC 226.

The first communication processor 212 may establish a communication channel in a band to be used for wireless communication with the first network 292 and may support communication via a legacy network through the established communication channel. According to various embodiments, the first network may be a legacy network including a second-generation (2G), 3G, 4G, or long-term evolution (LTE) network. The second communication processor 214 may establish a communication channel corresponding to a specified band (e.g., about 6 GHz to about 60 GHz) in a band to be used for wireless communication with the second network 294 and may support communication via a 5G network through the established communication channel. According to various embodiments, the second network 294 may be a 5G network defined by the 3GPP. In addition, according to an embodiment, the first communication processor 212 or the second communication processor 214 may establish a communication channel corresponding to a different specified band (e.g., about 6 GHz or lower) in the band to be used for wireless communication with the second network 294 and may support communication via a 5G network through the established communication channel.

The first communication processor 212 may transmit and receive data to and from the second communication processor 214. For example, data classified to be transmitted through the second cellular network 294 may be changed to be transmitted through the first cellular network 292. In this case, the first communication processor 212 may receive the data to be transmitted from the second communication processor 214. For example, the first communication processor 212 may transmit and receive data to and from the second communication processor 214 through an inter-processor interface 213. The inter-processor interface 213 may be configured, for example, as a universal asynchronous receiver/transmitter (UART, e.g., high-speed UART (HS-UART)) or peripheral component interconnect express (PCIe) bus interface but is not limited in type. Alternatively, the first communication processor 212 and the second communication processor 214 may exchange control information and packet data information, for example, using a shared memory. The first communication processor 212 may exchange various types of information, such as sensing information, output strength information, and resource block (RB) allocation information, with the second communication processor 214.

The first communication processor 212 may not be directly connected to the second communication processor 214 depending on a configuration. In this case, the first communication processor 212 may transmit and receive data to and from the second communication processor 214 via a processor 120 (e.g., an application processor). For example, the first communication processor 212 and the second communication processor 214 may transmit and receive data to and from each other through the processor 120 (e.g., the application processor) and an HS-UART interface or a PCIe interface, but the type of an interface is not limited. The first communication processor 212 and the second communication processor 214 may exchange control information and packet data information using the processor 120 (e.g., the application processor) and a shared memory.

Figure 2B:
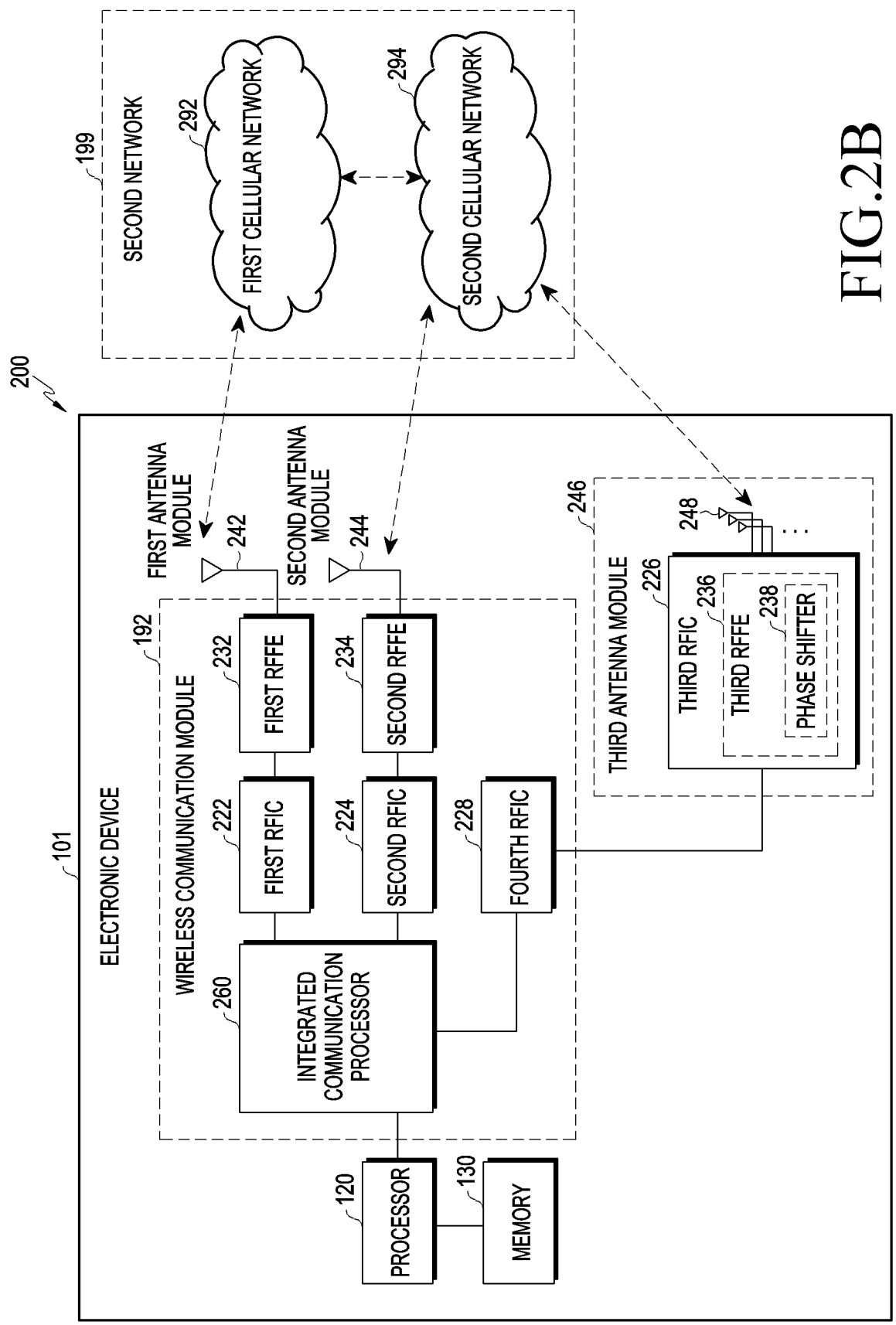
FIG. 2B is a block diagram illustrating an example electronic device for supporting communication via a legacy network and communication via a 5G network according to various embodiments.

According to an embodiment, the first communication processor 212 and the second communication processor 214 may be configured in a single chip or a single package. According to various embodiments, the first communication processor 212 or the second communication processor 214 may be configured along with the processor 120, a coprocessor 123, or a communication module 190 in a single chip or a single package. For example, as illustrated in FIG. 2B, an integrated communication processor 260 may support functions for communication with both a first cellular network and a second cellular network.

In transmission, the first RFIC 222 may convert a baseband signal generated by the first communication processor 212 into a radio-frequency (RF) signal of about 700 MHz to about 3 GHz used for the first network 292 (e.g., a legacy network). In reception, an RF signal may be obtained from the first network 292 (e.g., the legacy network) through an antenna (e.g., the first antenna module 242) and may be preprocessed by an RFFE (e.g., the first RFFE 232). The first RFIC 222 may convert the preprocessed RF signal into a baseband signal to be processed by the first communication processor 212.

In transmission, the second RFIC 224 may convert a baseband signal generated by the first communication processor 212 or the second communication processor 214 into an RF signal (hereinafter, "5G sub-6 RF signal") in a sub-6 band (e.g., about 6 GHz or lower) used for the second network 294 (e.g., a 5G network). In reception, a 5G sub-6 RF signal may be obtained from the second network 294 (e.g., the 5G network) through an antenna (e.g., the second antenna module 244) and may be preprocessed by an RFFE (e.g., the second RFFE 234). The second RFIC 224 may convert the preprocessed 5G sub-6 RF signal into a baseband signal to be processed by a corresponding communication processor of the first communication processor 212 or the second communication processor 214.

The third RFIC 226 may convert a baseband signal generated by the second communication processor 214 into an RF signal (hereinafter, "5G above-6 RF signal") in a 5G above-6 band (e.g., about 6 GHz to about 60 GHz) used for the second network 294 (e.g., the 5G network). In reception, a 5G above-6 RF signal may be obtained from the second network 294 (e.g., the 5G network) through an antenna (e.g., an antenna 248) and may be preprocessed by the third RFFE 236. The third RFIC 226 may convert the preprocessed 5G above-6 RF signal into a baseband signal to be processed by the second communication processor 214. According to an embodiment, the third RFFE 236 may be configured as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 into an RF signal (hereinafter, "IF signal") in an intermediate frequency band (e.g., about 9 GHz to about 11 GHz) and may transmit the IF signal to the third RFIC 226. The third RFIC 226 may convert the IF signal into a 5G above-6 RF signal. In reception, a 5G above-6 RF signal may be received from the second network 294 (e.g., the 5G network) through an antenna (e.g., the antenna 248) and may be converted into an IF signal by the third RFIC 226. The fourth RFIC 228 may convert the IF signal into a baseband signal to be processed by the second communication processor 214.

According to an embodiment, the first RFIC 222 and the second RFIC 224 may be configured as at least part of a single chip or a single package. According to an embodiment, the first RFFE 232 and the second RFFE 234 may be configured as at least part of a single chip or a single package. According to an embodiment, at least one of the first antenna module 242 or the second antenna module 244 may be omitted or may be combined with a different antenna module to process corresponding RF signals in a plurality of bands.

According to an embodiment, the third RFIC 226 and the antenna 248 may be disposed on the same substrate to form a third antenna module 246. For example, the wireless communication module 192 or the processor 120 may be disposed on a first substrate (e.g., a main PCB). In this case, the third RFIC 226 may be disposed in a portion (e.g., a lower surface) of a second substrate (e.g., a sub-PCB) separate from the first substrate, and the antenna 248 may be disposed in another portion (e.g., an upper surface), thereby forming the third antenna module 246. The third RFIC 226 and the antenna 248 may be disposed on the same substrate, thereby reducing the length of a transmission line therebetween, which may reduce loss (e.g., attenuation) of, for example, a signal in a high-frequency band (e.g., about 6 GHz to about 60 GHz) used for communication via a 5G network due to the transmission line. Accordingly, the electronic device 101 may improve the quality or speed of communication with the second network 294 (e.g., the 5G network).

According to an embodiment, the antenna 248 may be configured as an antenna array including a plurality of antenna elements which can be used for beamforming. In this case, the third RFIC 226 may include, for example, a plurality of phase shifters 238 corresponding to the plurality of antenna elements as part of the third RFFE 236. In transmission, each of the plurality of phase shifters 238 may convert the phase of a 5G above-6 RF signal to be transmitted to an external device (e.g., a base station of the 5G network) of the electronic device 101 through a corresponding antenna element. In reception, each of the plurality of phase shifters 238 may convert the phase of a 5G above-6 RF signal received from the outside through a corresponding antenna element into the same phase or substantially the same phase. This enables transmission or reception through beamforming between the electronic device 101 and the outside.

The second network 294 (e.g., the 5G network) may operate independently of the first network 292 (e.g., the legacy network) (e.g., stand-alone (SA) mode) or may be connected to operate (e.g., non-stand-alone (NSA) mode). For example, the 5G network may have only an access network (e.g., a 5G radio access network (RAN) or a next-generation RAN (NG RAN)) and may not have a core network (e.g., a next-generation core (NGC)). In this case, after accessing the access network of the 5G network, the electronic device 101 may access an external network (e.g., the Internet) under control of a core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in a memory 230 and may be accessed by a different component (e.g., the processor 120, the first communication processor 212, or the second communication processor 214).

Figure 3A:
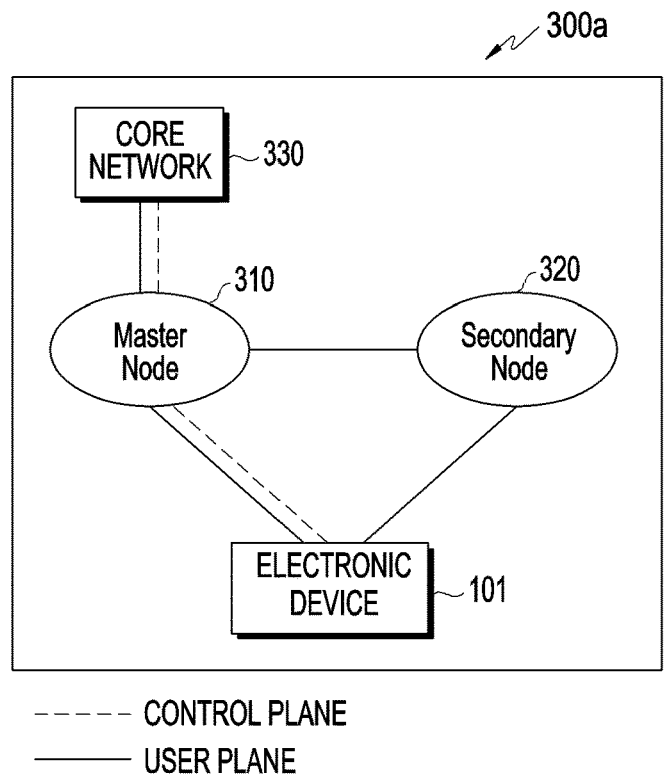
FIG. 3A illustrates example wireless communication systems providing a network for legacy communication and/or 5G communication according to various embodiments.
Figure 3B:
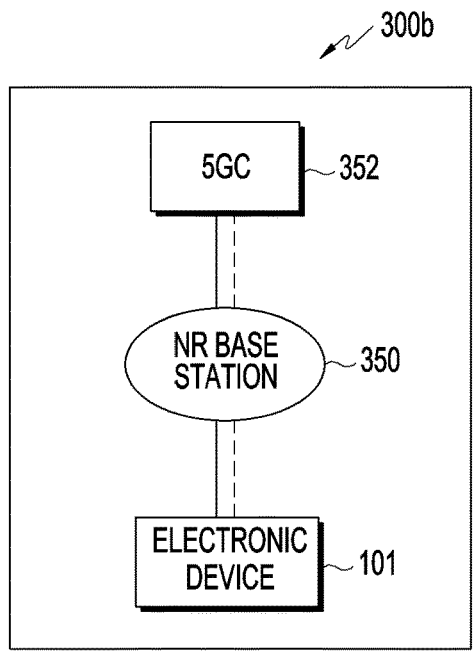
FIG. 3B illustrates example wireless communication systems providing a network for legacy communication and/or 5G communication according to various embodiments.
Figure 3C:
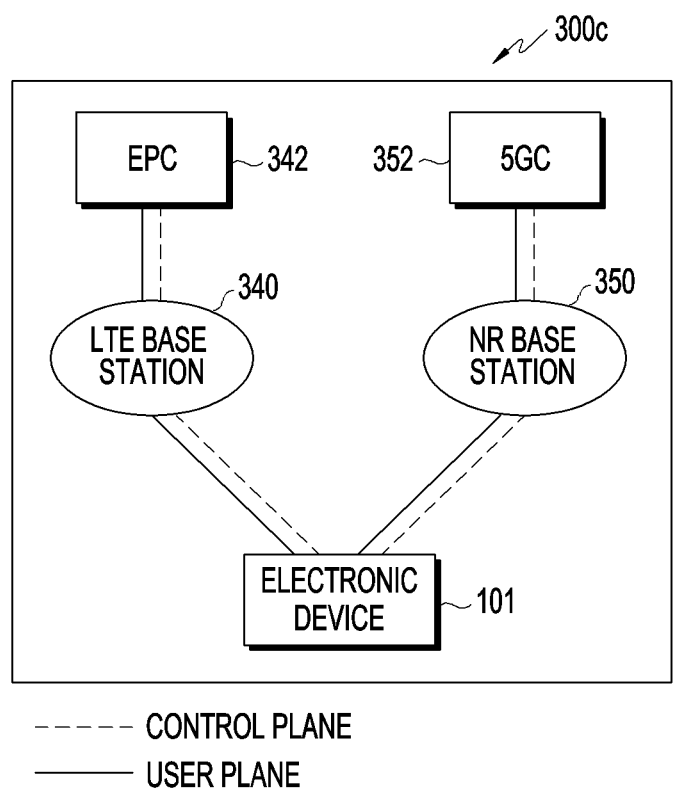
FIG. 3C illustrates example wireless communication systems providing a network for legacy communication and/or 5G communication according to various embodiments.

FIG. 3A, FIG. 3B, and FIG. 3C illustrate example wireless communication systems providing a network for legacy communication and/or 5G communication according to various embodiments. Referring to FIG. 3A, FIG. 3B, and FIG. 3C, network environments 300a, 300b and 300c may include at least one of a legacy network and a 5G network. The legacy network may include, for example, a 4G or LTE base station 340 (e.g., eNodeB (eNB)) according to a 3GPP standard supporting radio access with an electronic device 101 and an evolved packet core (EPC) 342 which manages 4G communication. The 5G network may include, for example, a new radio (NR) base station 350 (e.g., gNodeB (gNB)) supporting radio access with the electronic device 101 and a fifth-generation core (5GC) 352 which manages 5G communication of the electronic device 101.

According to various embodiments, the electronic device 101 may transmit and receive a control message and user data through legacy communication and/or 5G communication. The control message may include, for example, a message associated with at least one of security control, bearer setup, authentication, registration, or mobility management of the electronic device 101. The user data may refer to, for example, user data other than a control message transmitted and received between the electronic device 101 and a core network 330 (e.g., the EPC 342).

Referring to FIG. 3A, the electronic device 101 according to an embodiment may transmit or receive at least one of a control message or user data to or from at least part of the 5G network (e.g., the NR base station 350 and the 5GC 352) using at least part of the legacy network (e.g., the LTE base station 340 and the EPC 342).

According to various embodiments, a network environment 300a may include a network environment which provides wireless communication dual connectivity (DC) to the LTE base station 340 and the NR base station 350 and enables transmission and reception of a control message to and from the electronic device 101 through one core network 330 of the EPC 342 or the 5GC 352.

According to various embodiments, in a DC environment, one of the LTE base station 340 or the NR base station 350 may operate as a master node (MN) 310 and the other thereof may operate as a secondary node (SN) 320. The MN 310 may be connected to the core network 330 to transmit and receive a control message. The MN 310 and the SN 320 may be connected through a network interface to transmit and receive a message related to radio resource (e.g., communication channel) management to and from each other.

According to various embodiments, the MN 310 may include the LTE base station 340, the SN 320 may include the NR base station 350, and the core network 330 may include the EPC 342. For example, a control message may be transmitted and received through the LTE base station 340 and the EPC 342, and user data may be transmitted and received through at least one of the LTE base station 340 and the NR base station 350.

According to various embodiments, the MN 310 may include the NR base station 350, the SN 320 may include the LTE base station 340, and the core network 330 may include the 5GC 352. For example, a control message may be transmitted and received through the NR base station 350 and the 5GC 352, and user data may be transmitted and received through at least one of the LTE base station 340 and the NR base station 350.

Referring to FIG. 3B, according to various embodiments, the 5G network may include the NR base station 350 and the 5GC 352 and may independently transmit and receive a control message and user data to and from the electronic device 101.

Referring to FIG. 3C, the legacy network and the 5G network according to various embodiments may independently provide data transmission and reception. For example, the electronic device 101 and the EPC 342 may transmit and receive a control message and user data through the LTE base station 340. In another example, the electronic device 101 and the 5GC 352 may transmit and receive a control message and user data through the NR base station 350.

According to various embodiments, the electronic device 101 may be registered in at least one of the EPC 342 or the 5GC 352 to transmit and receive a control message.

According to various embodiments, the EPC 342 or the 5GC 352 may interwork to manage communication of the electronic device 101. For example, movement information about the electronic device 101 may be transmitted and received through an interface between the EPC 342 and the 5GC 352.

As described above, dual connectivity through the LTE base station 340 and the NR base station 350 may be referred to as E-UTRA new radio dual connectivity (EN-DC).

In a wireless communication system, an electronic device (e.g., user equipment (UE)) may access a wireless communication network to use a voice communication or data communication service at a set position or while moving. In order to provide a communication service for the electronic device, an appropriate authentication process is required.

Generally, a universal integrated circuit card (UICC) is inserted into the electronic device, and authentication is performed between servers of the electronic device and a mobile network operator (MNO) through a universal subscriber identity module (USIM) installed inside the UICC. A UICC may be referred to as a subscriber identity module (SIM) card in a global system for mobile communications (GSM), and may be referred to as a universal subscriber identity module (USIM) card in wideband code division multiple access (WCDMA), long-term evolution (LTE), and new radio (NR).

When a user of an electronic device subscribes to a wireless communication service provided by a mobile network operator, the mobile network operator may provide a UICC (e.g., a SIM card or USIM card) to the user, and the user may insert the provided UICC into the electronic device. When the UICC is inserted into the electronic device, a USIM application installed inside the UICC is executed, and accordingly an appropriate authentication process may be performed, using an international mobile subscriber identity (IMSI) value and an encryption key value for authentication which are stored in the UICC, with a server of the mobile network operator which stores the same values. After the appropriate authentication process is performed, the wireless communication service is available.

The UICC may be manufactured as a card dedicated to the specific mobile network operator by request of the mobile network operator when manufacturing the card, and authentication information (e.g., an USIM application and a subscriber identification ID (e.g., an IMSI)) and the encryption key (e.g., a known value of K or Ki) for access to a network of the mobile network operator may be preloaded in the UICC. The UICC may be provided to a subscriber to the communication service through the mobile network operator, and the mobile network operator may manage, for example, install, modify, and delete, an application in the UICC using over-the-air (OTA) technology or the like if necessary. The user may use the network and an application service of the mobile network operator by inserting the UICC into a user terminal, and may use the same authentication information, phone number, personal phone book, and the like stored in the UICC on a new phone by inserting the UICC detachable from the existing user terminal into the new user terminal when replacing the user terminal.

Unlike a UICC which is manufactured and distributed exclusively to a specific mobile network operator, a method is proposed which enables remote installation of a USIM application, a subscriber identification ID, and an encryption key of a mobile network operator in a UICC and enables secure and flexible installation and management of authentication information about different mobile network operators when a user subscribes to (or purchases) a communication service when purchasing the specific UICC or after obtaining the UICC, subscribes to or cancels a specific mobile network operator, or performs a subscription change to a different mobile network operator.

For example, an embedded UICC (eUICC) is proposed which enables remote installation of a profile for providing a communication service through a network without changing a UICC even though a user changes a mobile network operator. The eUICC may be manufactured as a UICC which is fixed and preloaded, for example, in the form of a chip, in a user terminal during manufacture of the user terminal. Therefore, the eUICC may be used not only for a general wireless terminal, such as a cellular phone, but also for various user terminals having a structure in which it is not easy to physically attach or detach a UICC, such as a machine-to-machine (M2M) or device-to-device (D2D) terminal. The eUICC may also be referred to as an eSIM.

Figure 4:
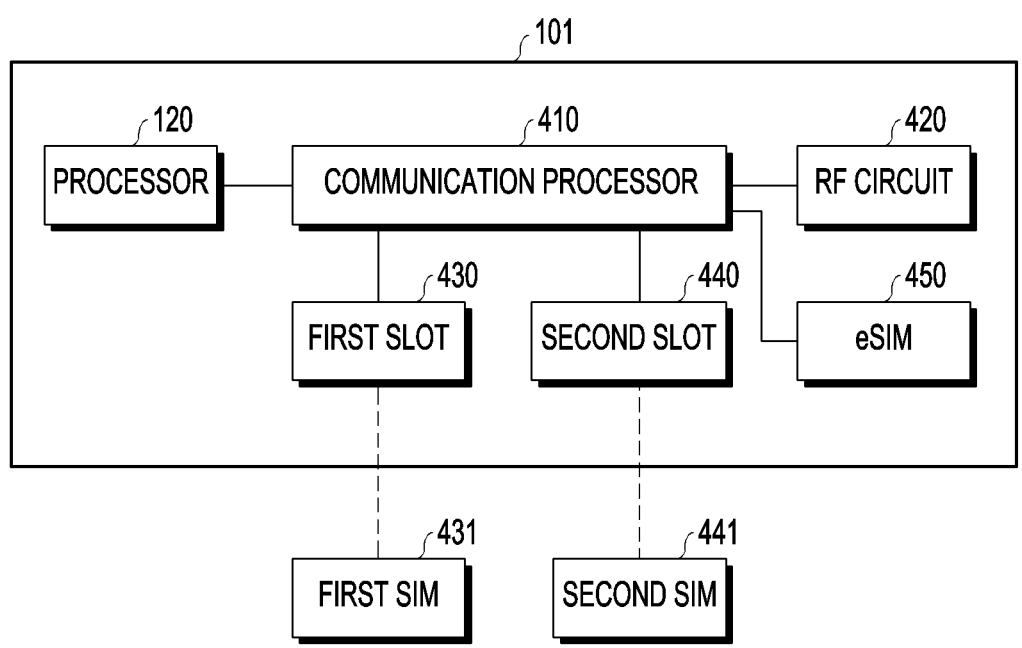
FIG. 4 is a block diagram illustrating an example electronic device according to various embodiments.

FIG. 4 is a block diagram illustrating an example electronic device according to various embodiments.

According to various embodiments, the electronic device 101 may include at least one of a processor (e.g., including processing circuitry) 120, a communication processor (e.g., including processing circuitry) 410 (e.g., the first communication processor 212, the second communication processor 214, or the integrated communication processor 260), an RF circuit 420, a first slot 430, a second slot 440, and/or an eSIM 450.

The communication processor 410 may include various processing circuitry and establish a communication channel in a band to be used for wireless communication and may support network communication through the established communication channel. For example, the communication processor 410 may support communication via at least one of second-generation (2G), 3G, 4G, or 5G networks but is not limited thereto. The RF circuit 420 may include, for example, at least one of a radio-frequency integrated circuit (RFIC), a radio-frequency front end (RFFE), or an antenna module.

The RF circuit 420 may process data (e.g., a baseband signal) output from the communication processor 410 into an RF signal and may transmit the RF signal through the antenna module. The RF circuit 420 may convert an RF signal received through the antenna module into a baseband signal and transmit the baseband signal to the communication processor 410. The RF circuit 420 may process an RF signal or a baseband signal according to a communication mode supported by the communication processor 410, and the type of the RF circuit 420 is not limited. An interface between components may be configured, for example, as a general-purpose input/output (GPIO), universal asynchronous receiver/transmitter (UART, e.g., high-speed UART (HS-UART)), or peripheral component interconnect express (PCIe) bus interface but is not limited in type. At least some components may exchange control information or packet data information, for example, using a shared memory. In the embodiment of FIG. 4, the processor 120 and the communication processor 410 are illustrated as different pieces of hardware, but this is merely for illustration. The processor 120 and the communication processor 410 may be configured as different pieces of hardware, whereas the processor 120 and the communication processor 410 may also be configured on a single chip according to another embodiment.

The communication processor 410 according to various embodiments may include various processing circuitry and perform an authentication process based on information stored in a SIM described above. The communication processor 410 may be connected to the first SIM 431 through the first slot 430. For example, the first SIM 431 may be connected to a stack (e.g., a stack according to ISO7816) of the communication processor 410.

In the embodiment of FIG. 4, the communication processor 410 may include two stacks. For example, the first slot 430 may, for example, be a structure for accommodating a first SIM 431, which may be an rSIM, and may include at least one terminal to transmit information from the first SIM 431 to the communication processor 410 when the first SIM 431 is accommodated. The second slot 440 may, for example, be a structure for accommodating a second SIM 441, which may be an rSIM, and may include at least one terminal to transmit information from the second SIM 441 to the communication processor 410 when the second SIM 441 is accommodated. The first slot 430 and the second slot 440 may be of the same type but may be of different types depending on a configuration.

The communication processor 410 may obtain information stored in the first SIM 431 from the first SIM 431 accommodated in the first slot 430. For example, at least one of the first SIM 431, the second SIM 441, or the eSIM 450 may store at least one of an integrated circuit card identifier (ICCID), an IMSI, information about a home public land mobile network (HPLMN), or a mobile subscriber international ISDN number (MSISIDN), which may be referred to as an elementary file (EF). The communication processor 410 may perform an authentication process for network communication corresponding to the first SIM 431 through the RF circuit 420 based on the obtained information stored in the first SIM 431. When authentication is successfully achieved, the communication processor 410 may perform the network communication corresponding to the first SIM 431 through the RF circuit 420. The communication processor 410 may perform an authentication process for network communication corresponding to the second SIM 441 through the RF circuit 420 based on obtained information stored in the second SIM 441. When authentication is successfully achieved, the communication processor 410 may perform the network communication corresponding to the second SIM 441 through the RF circuit 420. The communication processor 410 may perform an authentication process for network communication corresponding to the eSIM 450 through the RF circuit 420 based on obtained information stored in the eSIM 450. When authentication is successfully achieved, the communication processor 410 may perform the network communication corresponding to the eSIM 450 through the RF circuit 420.

Figure 5:
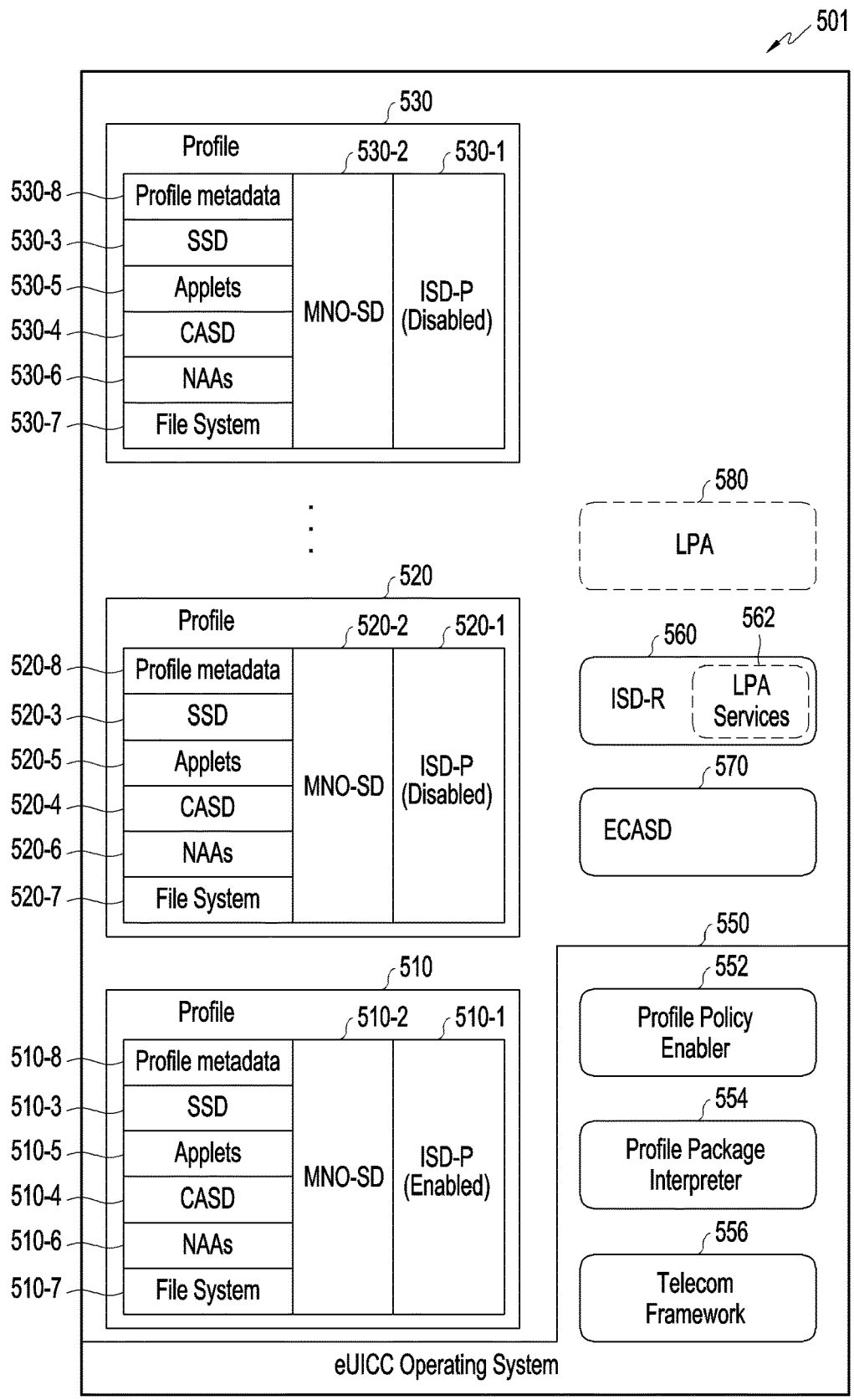
FIG. 5 illustrates an example internal structure of an eUICC according to various embodiments.

FIG. 5 is a diagram illustrating an example internal structure of an eUICC according to various embodiments.

The eUICC 501 (e.g., the eSIM 450 of FIG. 4) according to an embodiment may be in the form of a card or chip, and at least one of profiles 510, 520, and 530 in a software format may be installed in the eUICC 501. According to various embodiments, each of the at least one of the profiles 510, 520, and 530 may include a provisioning profile or an operational profile. At least one of the profiles 510, 520, and 530 may operate on an eUICC operating system (OS) 550. Each of the at least one of the profiles 510, 520, and 530 may be enabled or disabled by a processor or an LPA 580. In FIG. 5, one profile 510 according to an embodiment may be enabled, and the other profiles 520 and 530 may be disabled.

According to various embodiments, the eUICC OS 550 of the eUICC 501 may include a profile policy enabler (e.g., including various processing circuitry and/or executable program elements) 552, a profile package interpreter (e.g., including various processing circuitry and/or executable program elements) 554, and a telecom framework (e.g., including various processing circuitry and/or executable program elements) 556. According to an embodiment, the profile policy enabler 552 may include various processing circuitry and/or executable program elements and manage a profile policy rule (PPR) for each of the at least one of the profiles 510, 520, and 530. According to an embodiment, the profile package interpreter 554 may include various processing circuitry and/or executable program elements and unpackage a profile package received from a server (e.g., an SM-DP+ server) into a form which can be installed in the eUICC 501. According to an embodiment, the telecom framework 556 may include various processing circuitry and/or executable program elements and perform a function associated with communication of applications in the eUICC 501. According to various embodiments, the eUICC 501 may include an issuer security domain root (ISD-R) 560 and an ECASD 570. According to an embodiment, the ISD-R 560 may include various processing circuitry and/or executable program elements and manage the at least one of the profiles 510, 520, and 530 installed in the eUICC 501. For example, the ISD-R 560 may include LPA services 562, and the LPA services 562 may manage the at least one of the profiles 510, 520, and 530 installed in the eUICC 501 through an interface with the processor or the LPA 580. According to an embodiment, an eUICC controlling authority security domain (ECASD) 570 may perform security processing of the at least one of the profiles 510, 520, and 530 installed in the eUICC 501.

According to various embodiments, each of the at least one of the profiles 510, 520, and 530 may include an ISD-P 510-1, 520-1, or 530-1, an MNO-SD 510-2, 520-2, or 530-2, a supplementary security domain (SSD) 510-3, 520-3, or 530-3, a controlling authority security domain (CASD) 510-4, 520-4, or 530-4, applets 510-5, 520-5, or 530-5, network access applications (NAAs) 510-6, 520-6, or 530-6, a file system 510-7, 520-7, or 530-7, or profile metadata 510-8, 520-8, or 530-8.

According to an embodiment, the ISD-P 510-1, 520-1, or 530-1 may include information for decoding and interpreting a profile package and may be used to unpackage and install a profile package received from the server (e.g., the SM-DP+ server) in cooperation with the profile package interpreter 554.

According to an embodiment, the MNO-SD 510-2, 520-2, or 530-2 may include an over-the-air (OTA) key of an MNO and may include information for providing a secure OTA channel for communication with the MNO.

According to an embodiment, the SSD 510-3, 520-3, or 530-3 and the CASD 510-4, 520-4, or 530-4 may include information for performing security processing of the profile.

According to an embodiment, the applets 510-5, 520-5, or 530-5 may include various pieces of application information associated with a user of the profile.

According to an embodiment, the NAAs 510-6, 520-6, or 530-6 may include application information for allowing the profile to access a network.

According to an embodiment, the file system 510-7, 520-7, or 530-7 may include a file system associated with individual information of the profile.

According to an embodiment, the profile metadata 510-8, 520-8, or 530-8 may be referred to as a profile record and may include metadata information about the profile in a text format. The metadata information may include at least one of an integrated circuit card ID (ICCID) of the profile, a profile name, a profile-providing MNO name, a profile nickname of a user, an icon, a profile class, notification configuration information, profile owner information, or a profile policy rule (PPR).

According to various embodiments, the ICCID of the profile may include a profile identifier and may indicate a unique identifier of each profile. The profile name may include the name of each profile. The profile-providing MNO name may include the name of a mobile network operator providing the profile. The profile nickname of the user may include a profile nickname designated by the user. The icon may include an icon corresponding to the profile. The profile class may include information indicating whether the type of the profile is a provisioning profile or an operational profile. The notification configuration information may include the address of a server (e.g., an SM-DP+ server) to receive a notification. The profile owner information may include a mobile country code (MCC), a mobile network code (MNC), and group identifier (GID) 1 or 2 associated with a profile owner. For example, the mobile country code (MCC) may be a code for identifying a country, and the mobile network code (MNC) may be a code for identifying a mobile communication service provider. Group identifier (GID) 1 or 2 may be code area information for identifying a group or an area to which the profile belongs. The area information may include a group including a plurality of countries. The profile policy rule (PPR) may include policy rule information for managing the profile.

According to various embodiments, the electronic device 101 may identify whether each of the at least one of the profiles 510, 520, and 530 is a provisioning profile or an operational profile using profile class information of the profile metadata 510-8, 520-8, or 530-8 included in each of the at least one of the profiles 510, 520, and 530 included in the eUICC 501 and may enable or disable the provisioning profile or the operational profile through the LPA 580.

An electronic device according to any one of various example embodiments may include: at least one antenna module including at least one antenna; a universal integrated circuit card (UICC) configured to store at least one piece of subscriber identity information; and at least one processor electrically connected to the UICC, wherein the at least one processor may be configured to: receive a request to initialize a subscriber identity module (SIM) stored in the UICC; identify whether the UICC includes information about a list of a wireless communication network service to which a user subscribes; and in response to identifying that the UICC includes the information about the list of the wireless communication network service to which the user subscribes, control the electronic device to perform wireless communication network connection through the at least one antenna module based on the information about the list of the wireless communication network service to which the user subscribes being included in the UICC.

According to various example embodiments, the at least one processor may be configured to: in response to identifying that the UICC comprises the information about the list of the wireless communication network service to which the user subscribes, identify the information about the list of the wireless communication network service to which a user subscribes included in the UICC; and control the electronic device to perform wireless communication network connection for at least one wireless communication network service to which the user subscribes based on the identified information.

According to various example embodiments, the at least one processor may be configured to control the electronic device to perform the wireless communication network connection for the at least one wireless communication network service to which the user subscribes based on a preset priority.

According to various example embodiments, the information about the list of the wireless communication network service to which the user subscribes may be stored as an elementary file (EF) in the UICC.

According to various example embodiments, the information about the list of the wireless communication network service to which the user subscribes may include information corresponding to at least one communication network among a 2G communication network, a 3G communication network, a 4G communication network, and a 5G communication network.

An electronic device according to any one of various example embodiments may include: at least one antenna module including at least one antenna; a universal integrated circuit card (UICC) configured to store at least one piece of subscriber identity information; and at least one processor electrically connected to the UICC, wherein the at least one processor may be configured to: identify occurrence of an event of connection to a second wireless communication network while being connected to a first wireless communication network through the at least one antenna module; identify whether the UICC includes information about a list of a wireless communication network service to which a user subscribes; in response to identifying that the UICC includes the information about the list of the wireless communication network service to which the user subscribes, identify whether the user subscribes to a wireless network communication service corresponding to the second wireless communication network based on the information about the list of the wireless communication network service to which the user subscribes being included in the UICC; and control the electronic device to perform connection with the second wireless communication network through the at least one antenna module based on whether the user subscribes to the wireless network communication service corresponding to the second wireless communication network.

According to various example embodiments, the at least one processor may be configured to: in response to identifying whether the user subscribes to the wireless network communication service corresponding to the second wireless communication network, control the electronic device to maintain connection with the first wireless communication network based on the wireless network communication service corresponding to the second wireless communication network not being enabled.

According to various example embodiments, the at least one processor may be configured to control the electronic device to perform the connection with the second wireless communication network in response to identifying whether the user subscribes to the wireless network communication service corresponding to the second wireless communication network.

According to various example embodiments, the information about the list of the wireless communication network service to which the user subscribes may be stored as an elementary file (EF) in the UICC.

According to various example embodiments, the information about the list of the wireless communication network service to which the user subscribes may include information corresponding to at least one communication network among a 2G communication network, a 3G communication network, a 4G communication network, and a 5G communication network.

For example, an electronic device supporting a 5G SA communication mode may perform unnecessary frequency scanning for 5G RAT even though not subscribing to a 5G service. In addition, when a 5G base station (gNB) is found during frequency scanning, the electronic device may attempt unnecessary 5G frequency registration. A frequency band operating in 5G may be as illustrated by way of example in Table 1 and Table 2.

TABLE 1

| NR operating band | Uplink (UL) operating band BS receive/UE transmit $F_{UL, low}$-$F_{UL, high}$ | Downlink (DL) operating band BS transmit/UE receive $F_{DL, low}$-$F_{DL, high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2820 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n20 | 832 MHz-882 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n34 | 2010 MHz-2025 MHz | 2010 MHz-2025 MHz | TDD |
| n38 | 2570 MHz-2620 MHz | 2570 MHz-2820 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n50 | 1432 MHz-1517 MHz | 3432 MHz-1517 MHz | TDD |
| n51 | 1427 MHz-1432 MHz | 1427 MHz-1432 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1895 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3200 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 KHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n88 | 1710 MHz-1780 MHz | N/A | SUL |

TABLE 2

| NR operating band | Uplink (UL) and Downlink (DL) operating band BS transmit/receive UE transmit/receive $F_{UL, low}$-$F_{UL, high}$ $F_{DL, low}$-$F_{DL, high}$ | Duplex Mode |
|---|---|---|
| n257 | 26500 MHz-29500 MHz | TDD |
| n258 | 24250 MHz-27500 MHz | TDD |
| n260 | 37000 MHz-40000 MHz | TDD |
| n261 | 27500 MHz-28350 MHz | TDD |

Table 1 may illustrate frequency bands corresponding to frequency range (FR) 1 among frequency bands operating in 5G NR, and Table 2 may illustrate frequency bands corresponding to FR 2 among the frequency bands operating in 5G NR.

An electronic device may scan frequencies of all supported RATs and needs to attempt registration in order to identify whether it is possible to register in a found frequency, and thus it takes a considerable time for the electronic device to register in or reconnect to a specific network service.

In various example embodiments to be described in greater detail below, when the electronic device supports a specific frequency band but the frequency band is not included in a wireless communication network service to which a user subscribes, the electronic device may not attempt to search for and register the frequency band.

Hereinafter, various example operating methods performed by the electronic device 101 described above in FIG. 1, FIG. 2A, FIG. 2B, FIG. 3A, FIG. 3B, FIG. 3C, FIG. 4 and FIG. 5 according to various embodiments will be described in greater detail below with reference to FIG. 6, FIG. 7, FIG. 8, FIG. 9, FIG. 10 and FIG. 11.

Figure 6:
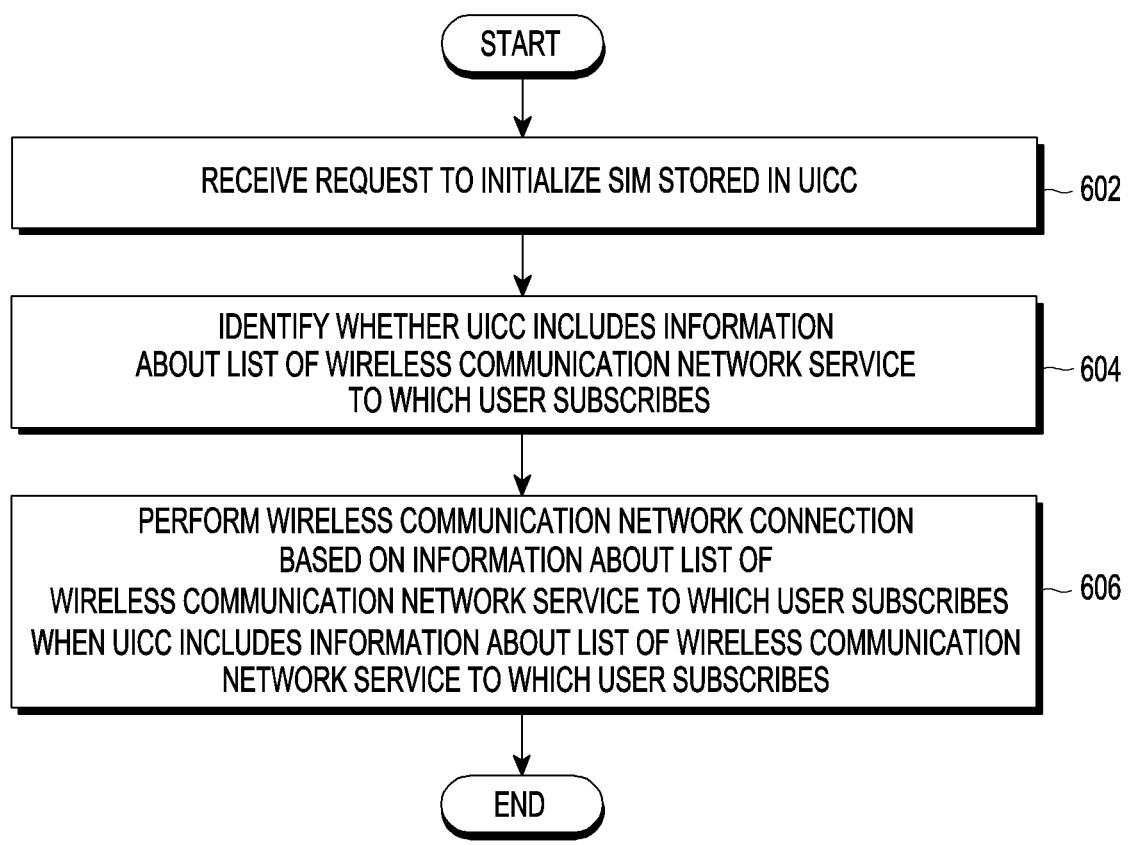
FIG. 6 is a flowchart illustrating an example method of operating an electronic device according to various embodiments.

FIG. 6 is a flowchart illustrating an example method of operating an electronic device according to various embodiments. Referring to FIG. 6, in operation 602, the electronic device 101 (e.g., at least one processor 120, 212, 214, 260, or 410 of the electronic device) may receive a request to initialize a SIM stored in a UICC. The request to initialize the SIM may be performed when the electronic device which is powered off is powered on, when the electronic device is booted, or when a SIM card is mounted or remounted in the electronic device, but embodiments disclosed herein are not limited thereto.

In operation 604, the electronic device may identify whether the UICC includes information about a list of a wireless communication network service to which a user subscribes. According to various embodiments, the list of the wireless communication network service to which the user subscribes may be stored in the UICC in the form of an elementary file (EF) as illustrated in FIG. 10.

Figure 10:
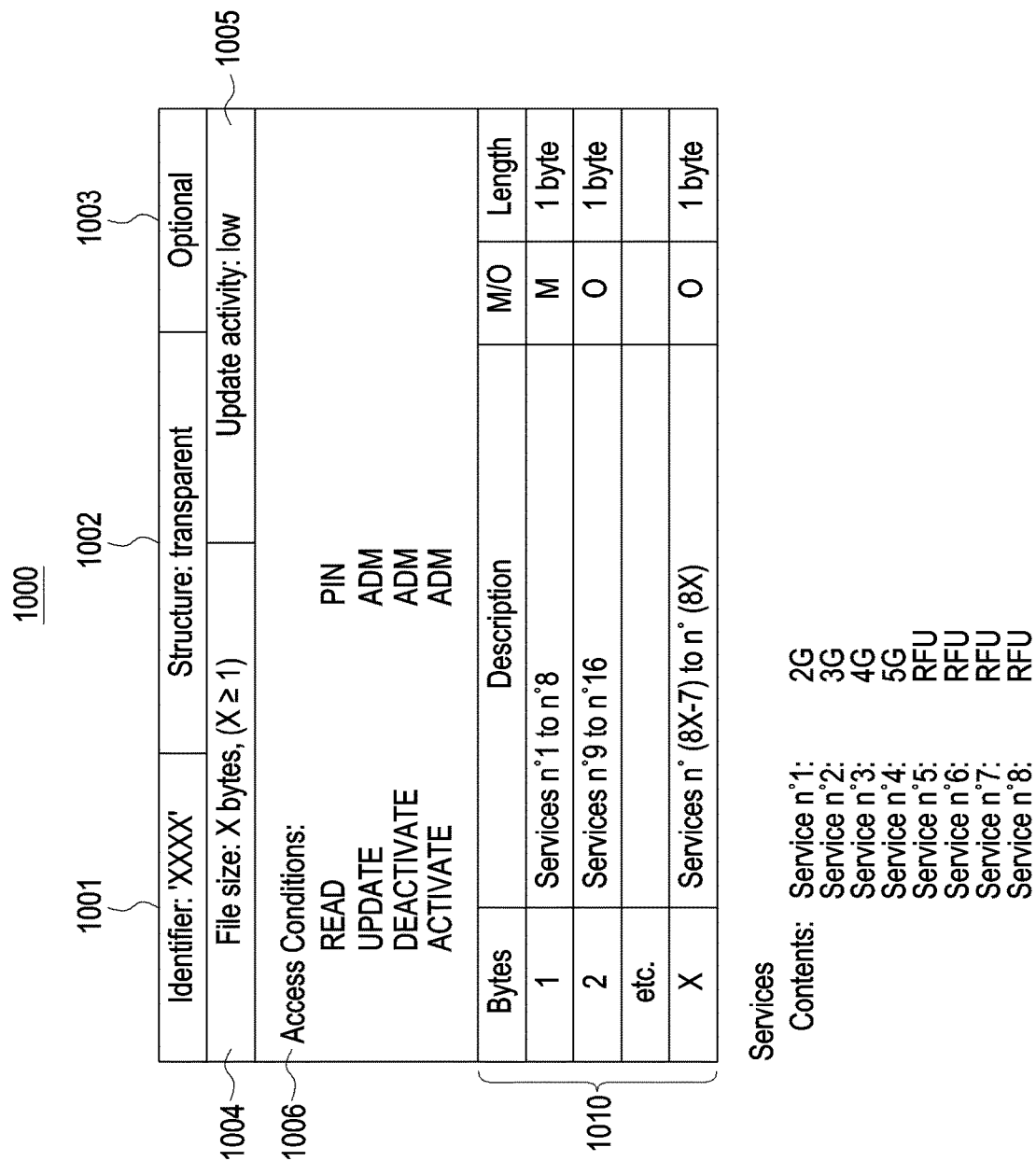
FIG. 10 is a diagram illustrating an example of an elementary file (EF) included in a SIM card according to various embodiments.

Referring to FIG. 10, an elementary file 1000 (e.g., EF_RAT) may be added as a SIM field including the list of the wireless communication network service to which the user subscribes into the UICC. Referring to FIG. 10, the elementary file 1000 may include identifier 1001, structure 1002, optional 1003, file size 1004, update activity 1005, access condition 1006, and services contents 1010 fields.

According to various embodiments, the services contents 1010 field of the elementary file 1000 added into the UICC may include information about a list of at least one wireless communication network service to which the user subscribes. For example, the services contents 1010 field of the elementary file 1000 may include 2G, 3G, 4G, and 5G as wireless communication network services to which the user subscribes. Although FIG. 10 shows 2G, 3G, 4G and 5G communication networks as examples of a wireless communication network service, embodiments disclosed herein are not limited thereto. Instead, embodiments disclosed herein may be equally or similarly applied to a wireless communication network service (e.g., 6G) to be added after the 5G communication network.

For example, the wireless communication network service to which the user subscribes may be included in a first byte of the services contents 1010 field, and each wireless communication network service may correspond to each bit of the first byte. For example, a first bit may correspond to 2G, a second bit may correspond to 3G, a third bit may correspond to 4G, and a fourth bit may correspond to 5G. When each bit corresponding to each wireless communication network service is 1, it may be determined that the user subscribes to the wireless communication network service, and when each bit is 0, it may be determined that the user does not subscribe to the wireless communication network service.

In operation 606, when the UICC includes the information (e.g., the elementary file 1000 illustrated in FIG. 10) about the list of the wireless communication network service to which the user subscribes as illustrated in FIG. 10, the electronic device may perform wireless communication network connection based on the information about the list of the wireless communication network service to which the user subscribes.

According to various embodiments, when the first byte in the elementary file 1000 illustrated in FIG. 10 is 11100000, the user that registers the SIM card may be a user that subscribes to 2G, 3G, and 4G services but does not subscribe to a 5G service. According to various embodiments, when the request to initialize the SIM is received as described above, wireless communication network connection may be performed excluding the 5G communication network based on the services contents 1010 field of the elementary file 100. For example, the electronic device may perform wireless communication network connection in the order of 4G, 3G, and 2G according to a preset priority excluding the 5G communication network.

Figure 7A:
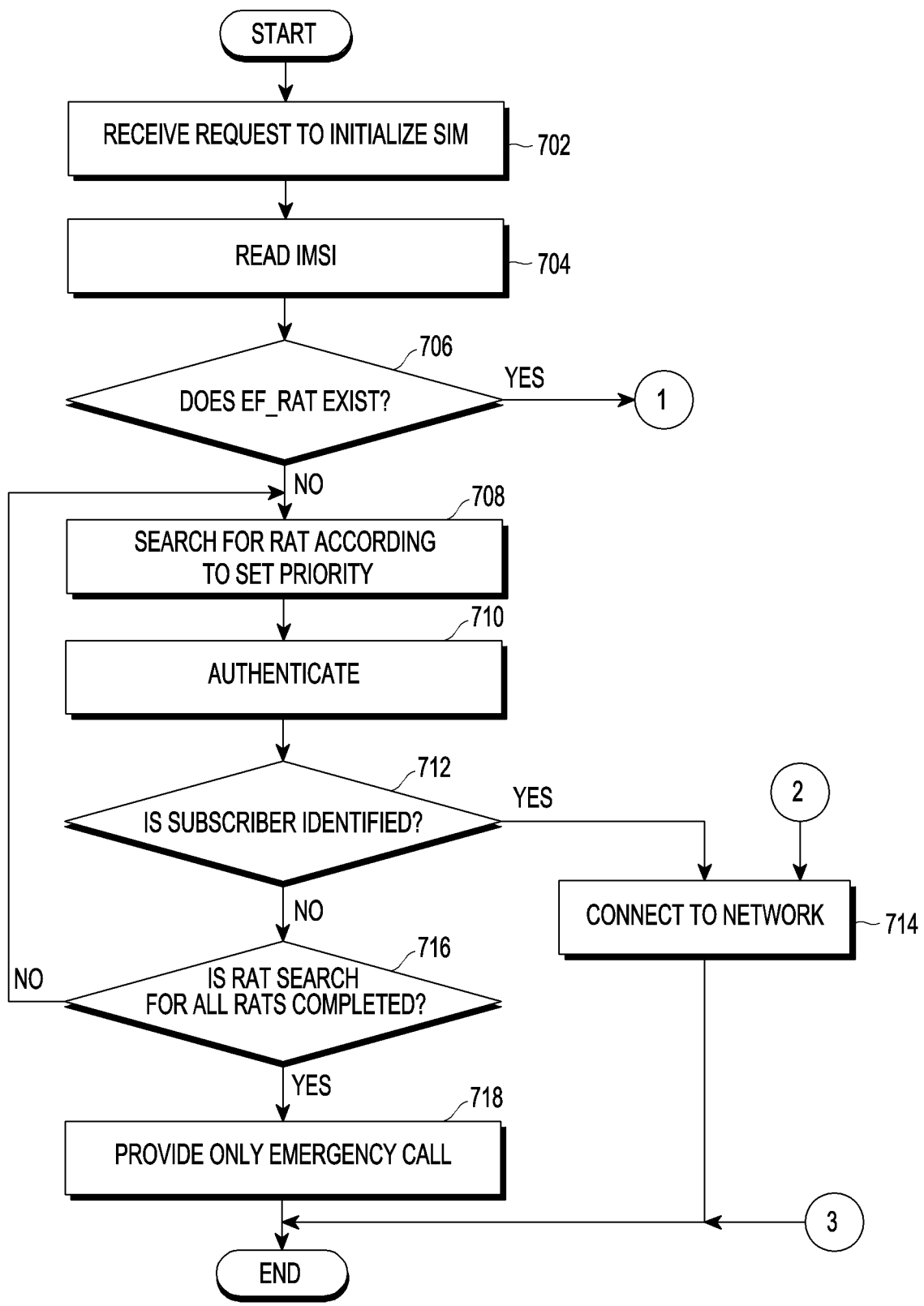
FIG. 7A is a flowchart illustrating an example method of operating an electronic device according to various embodiments.
Figure 7B:
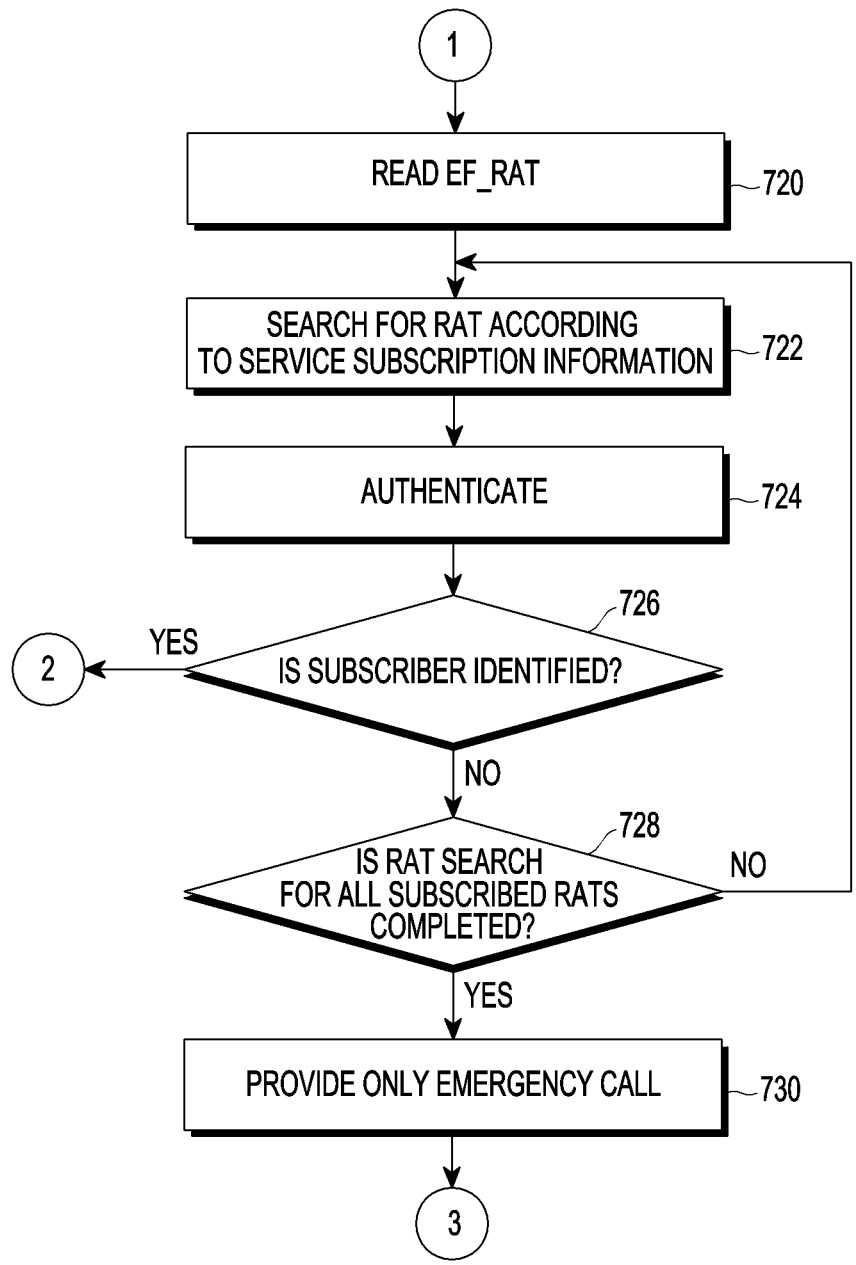
FIG. 7B is a flowchart illustrating an example method of operating an electronic device according to various embodiments.

FIG. 7A is a flowchart illustrating an example method of operating an electronic device according to various embodiments, and FIG. 7B is a flowchart illustrating an example method of operating an electronic device according to various embodiments. Referring to FIG. 7A and FIG. 7B, in operation 702, the electronic device 101 (e.g., at least one processor 120, 212, 214, 260, or 410 of the electronic device) may receive a request to initialize a SIM stored in a UICC. The request to initialize the SIM may, for example, be performed when the electronic device which is powered off is powered on, when the electronic device is booted, or when a SIM card is mounted or remounted in the electronic device, but embodiments disclosed herein are not limited thereto.

In operation 704, the electronic device may read an IMSI included in the UICC and may be booted. The electronic device may identify whether the UICC includes information about a list of a wireless communication network service to which a user subscribes. According to various embodiments, the list of the wireless communication network service to which the user subscribes may be stored in the UICC in the form of an elementary file (EF, e.g., EF_RAT) as illustrated in FIG. 10.

According to various embodiments, when there is no EF_RAT in the UICC as a result of the identification in operation 706, the electronic device may perform an RAT search according to a preset priority in operation 708. When the electronic device supports a plurality of wireless communication networks, an RAT search may be sequentially performed for the plurality of wireless communication networks. For example, when the electronic device supports 2G, 3G, 4G, and 5G communication networks and 5G, 4G, 3G, and 2G have RAT search priorities in order, an RAT search may be sequentially performed according to the search priorities.

When performing each RAT search, the electronic device may perform subscriber authentication in operation 710. As a result of the authentication, when a subscriber is identified in operation 712, the electronic device may perform network connection according to a found RAT in operation 714. As a result of the authentication, when the subscriber is not identified in operation 712, the electronic device may perform an operation of searching for a next RAT.

The electronic device may repeat operation 708, 710 and operation 712. When the subscriber is not identified until the RAT search for all RATs is completed in operation 716, the electronic device may provide only an emergency call in operation 718.

According to various embodiments, when there is EF_RAT in the UICC as a result of the identification in operation 706, the electronic device may read EF_RAT in operation 720 and may perform an RAT search based on service subscription information included in EF_RAT in operation 722. For example, when a user that registers the SIM card according to the information included in EF_RAT subscribes to 2G, 3G, and 4G services but does not subscribe to a 5G service, the electronic device may perform connection to the wireless communication networks other than the 5G communication network based on EF_RAT. For example, the electronic device may perform wireless communication network connection in the order of 4G, 3G, and 2G other than the 5G communication network according to the preset priorities.

When performing each RAT search, the electronic device may perform subscriber authentication in operation 724. As a result of the authentication, when a subscriber is identified in operation 726, the electronic device may perform network connection according to a found RAT in operation 714. As a result of the authentication, when the subscriber is not identified in operation 726, the electronic device may perform an operation of searching for a next RAT.

The electronic device may repeat operation 722, 724 and operation 726. When the subscriber is not identified until the RAT search for all RATs is completed in operation 728, the electronic device may provide only an emergency call in operation 730.

Figure 8:
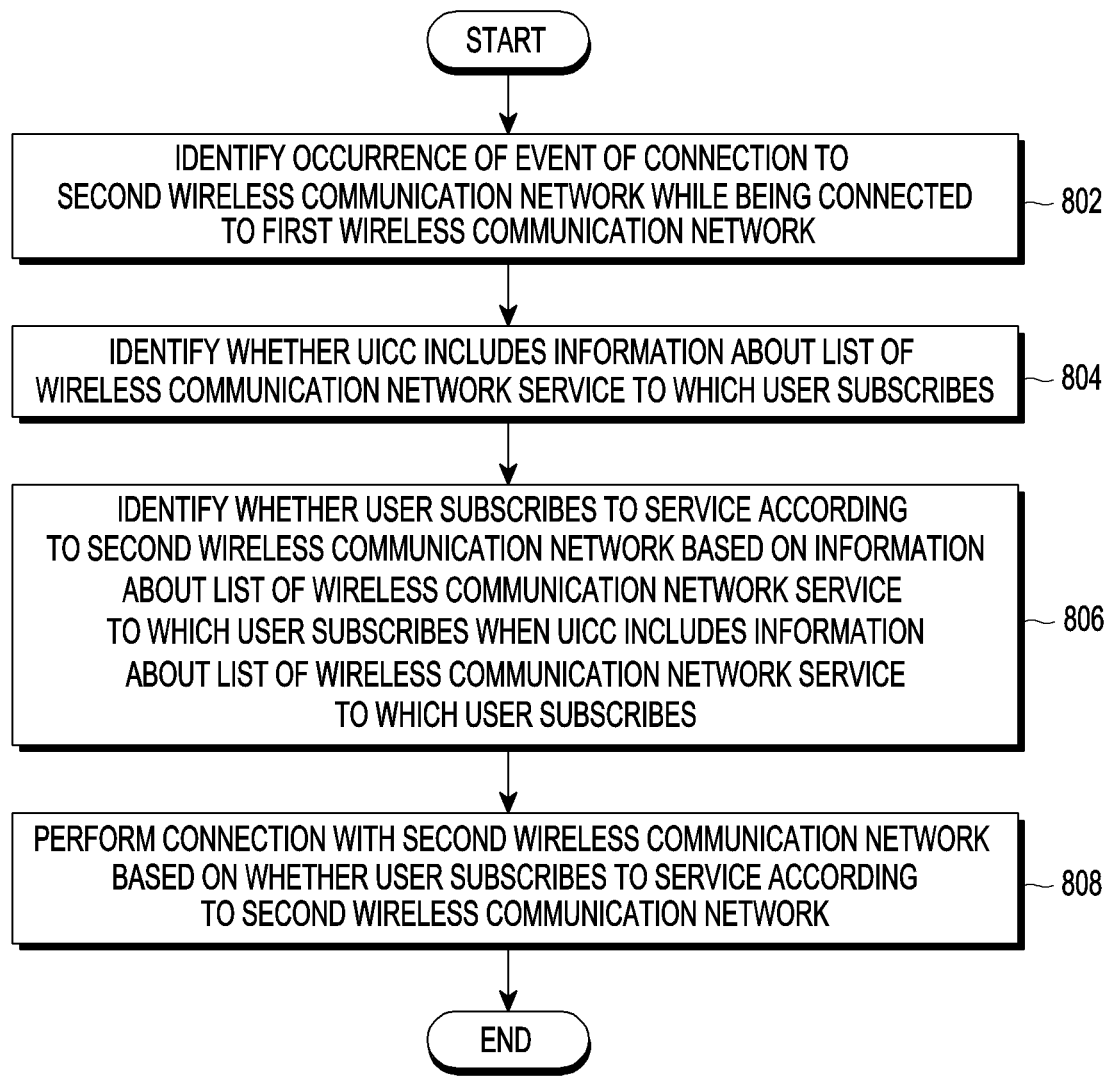
FIG. 8 is a flowchart illustrating an example method of operating an electronic device according to various embodiments.

FIG. 8 is a flowchart illustrating an example method of operating an electronic device according to various embodiments. Referring to FIG. 8, in operation 802, the electronic device 101 (e.g., at least one processor 120, 212, 214, 260, or 410 of the electronic device) may identify that an event of connection to a second wireless communication network occurs while being connected to a first wireless communication network. According to various embodiments, with the electronic device connected to the first wireless communication network, the event of connection to the second wireless communication network may occur when the electronic device in an idle state moves from a cell providing the first wireless communication network to a cell providing the second wireless communication network and thus reselects a cell. However, embodiments disclosed herein are not limited to this example.

In operation 804, the electronic device may identify whether a UICC includes information about a list of a wireless communication network service to which a user subscribes. According to various embodiments, the list of the wireless communication network service to which the user subscribes may be stored in the UICC in the form of an elementary file (EF) as illustrated in FIG. 10.

According to various embodiments, a services contents 1010 field of an elementary file 1000 added into the UICC may include information about a list of at least one wireless communication network service to which the user subscribes. For example, the services contents 1010 field of the elementary file 1000 may include 2G, 3G, 4G, and 5G as wireless communication network services to which the user subscribes.

In operation 806, when the UICC includes the information (e.g., the elementary file 1000 illustrated in FIG. 10) about the list of the wireless communication network service to which the user subscribes as illustrated in FIG. 10, the electronic device may identify whether the user has subscribed to a service according to the second wireless communication network based on the information about the list of the wireless communication network service to which the user subscribes.

In operation 808, the electronic device may perform connection with the second wireless communication network based on whether the user has subscribed to the service according to the second wireless communication network. For example, assuming that the first wireless communication network is a 4G communication network, the second wireless communication network is a 5G communication network, and the user has not subscribed to the 5G communication network, the electronic device may move to a cell providing the 5G communication network by moving to a cell while being connected to the 4G communication network. According to various embodiments, as described above, when an event of connection to the 5G communication network occurs, the electronic device may identify whether the user has not subscribed to the 5G communication network based on the services contents 1010 field of the elementary file 1000 and may not try to connect to the 5G communication network.

Figure 9A:
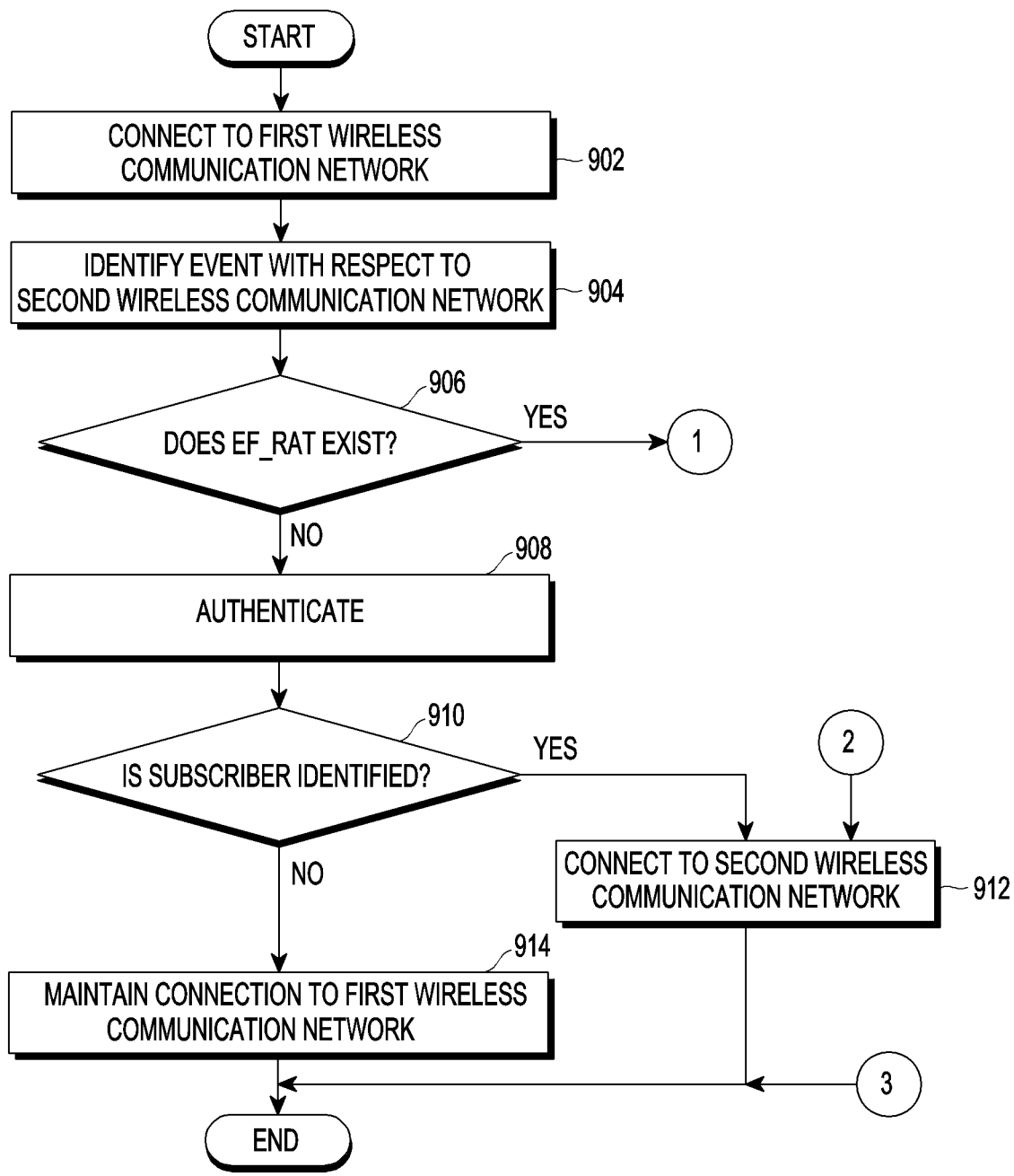
FIG. 9A is a flowchart illustrating an example method of operating an electronic device according to various embodiments.
Figure 9B:
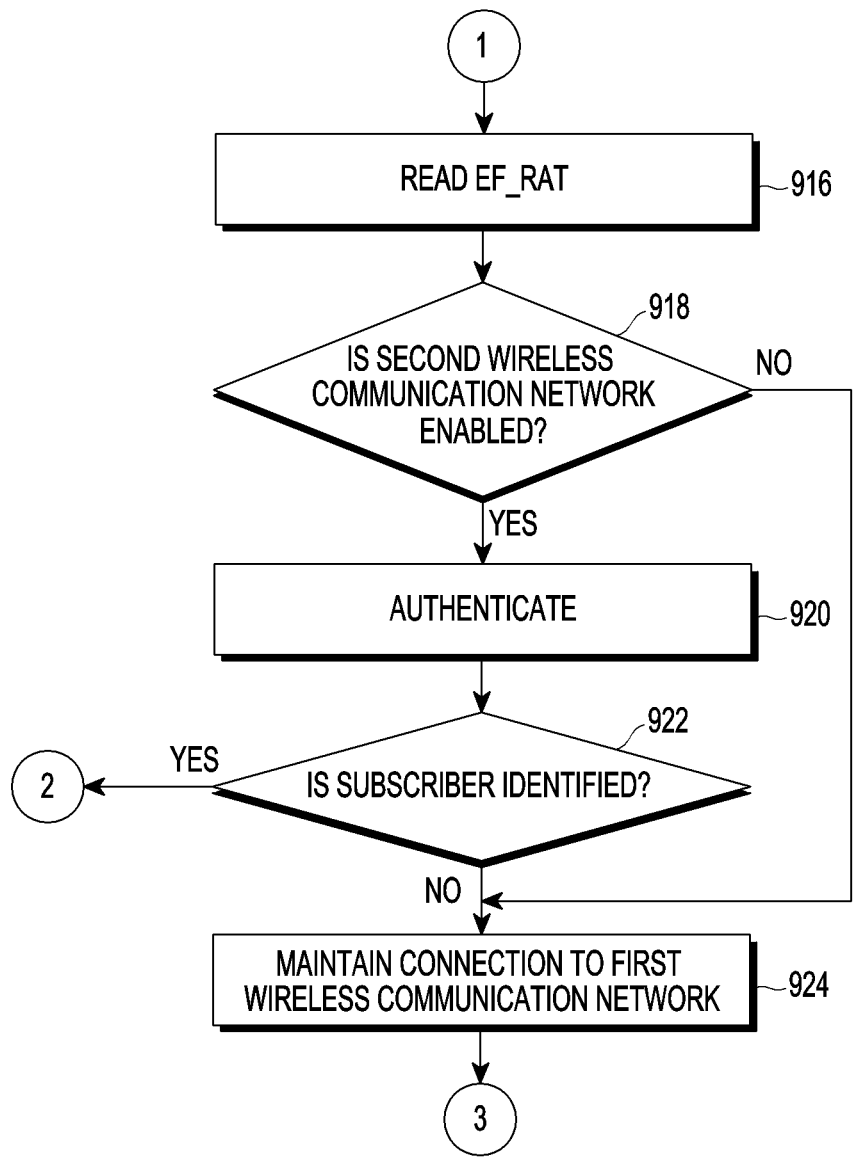
FIG. 9B is a flowchart illustrating an example method of operating an electronic device according to various embodiments.

FIG. 9A is a flowchart illustrating an example method of operating an electronic device according to various embodiments, and FIG. 9B is a flowchart illustrating an example method of operating an electronic device according to various embodiments. Referring to FIG. 9A and FIG. 9B, in operation 902, the electronic device 101 (e.g., at least one processor 120, 212, 214, 260, or 410 of the electronic device) may connect to a first wireless communication network. In operation 904, the electronic device may identify occurrence of an event with respect to a second wireless communication network. According to various embodiments, with the electronic device connected to the first wireless communication network, the event of connection to the second wireless communication network may occur when the electronic device in an idle state moves from a cell providing the first wireless communication network to a cell providing the second wireless communication network and thus reselects a cell. However, embodiments disclosed herein are not limited to this example.

According to various embodiments, the electronic device may identify whether a UICC includes information about a list of a wireless communication network service to which a user subscribes. According to various embodiments, the list of the wireless communication network service to which the user subscribes may be stored in the UICC in the form of an elementary file (EF, e.g., EF_RAT)) as illustrated in FIG. 10.

According to various embodiments, when there is no EF_RAT in the UICC as a result of the identification in operation 906, the electronic device may perform subscriber authentication for the second wireless communication network in operation 908. As a result of the authentication, when a subscriber is identified in operation 910, the electronic device may perform connection to the second wireless communication network in operation 912. As a result of the authentication, when the subscriber is not identified in operation 910, the electronic device may maintain currently established connection to the first wireless communication network in operation 914.

According to various embodiments, when there is EF_RAT in the UICC as a result of the identification in operation 906, the electronic device may read EF_RAT in operation 916 and may identify whether the second wireless communication network is enabled based on service subscription information included in EF_RAT in operation 918. For example, when a user that registers the SIM card according to the information included in EF_RAT subscribes to 2G, 3G, and 4G services but does not subscribe to a 5G service (e.g., when the 5G service is not enabled), the electronic device may not perform connection to a 5G communication network based on EF_RAT.

According to various embodiments, as a result of identifying the service subscription information included in EF_RAT, when the second wireless communication network is enabled in operation 918, the electronic device may perform subscriber authentication in operation 920. As a result of the authentication, when the subscriber is identified in operation 922, the electronic device may perform connection to the second wireless communication network in operation 912. As a result of the authentication, when the subscriber is not identified in operation 922, the electronic device may maintain connection to the first wireless communication network in operation 924.

According to various embodiments, when the electronic device is in a roaming state, the electronic device may sequentially perform a search for designated wireless communication networks according to a set order regardless of presence of EF_RAT in the UICC. According to another embodiment, even when the electronic device is in the roaming state, the electronic device may determine whether EF_RAT is present in the UICC. In this case, when EF_FAT is present in the UICC, the electronic device may perform a process for connection to a wireless communication network by a method equivalent or similar to the foregoing process of FIG. 9A and FIG. 9B based on information about a list of a wireless communication network service to which the user subscribes for a roaming service, which is included in EF_RAT.

Figure 11:
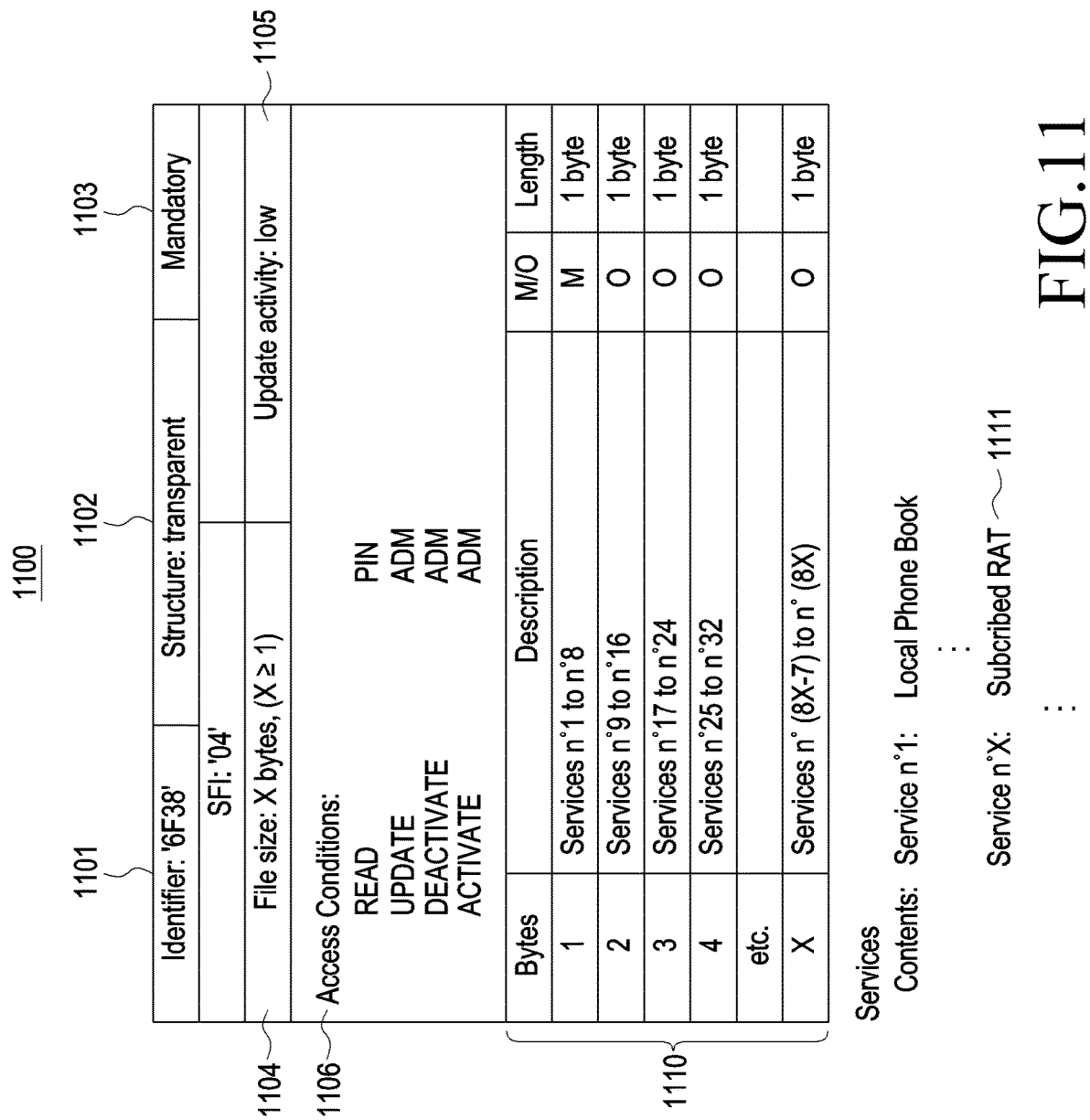
FIG. 11 is a diagram illustrating an example of an elementary file (EF) included in a SIM card according to various embodiments.

FIG. 11 is a diagram illustrating an example of an elementary file (EF) included in a SIM card according to various embodiments. According to various embodiments, presence or absence of EF_RAT illustrated in FIG. 10 may be stored in a UICC in the form of an elementary file (EF) as illustrated in FIG. 11.

Referring to FIG. 11, the SIM card may include an elementary file 1100 (e.g., EF_UST) as a SIM field including a list of a service (e.g., a USIM service table (UST)) that can be provided through a SIM file in the UICC. Referring to FIG. 11, the elementary file 1100 may include identifier 1101, structure 1102, mandatory 1103, file size 1104, update activity 1105, access condition 1106, and services contents 1110 fields.

According to various embodiments, the services contents 1110 field of the elementary file 1100 added into the UICC may include information about a list of at least one service that can be provided through the SIM card. For example, the services contents 1110 field of the elementary file 1100 may include information about a subscribed RAT information 1111 service. When the subscribed RAT information 1111 service is included in the services contents 1110 field of the elementary file 1100, an electronic device may determine that EF_RAT is included as the elementary file in the UICC. According to various embodiments, the electronic device may identify that the subscribed RAT information service included in EF_UST is provided and may identify EF_RAT.

According to various embodiments, the elementary file 1000 or 1100 shown in FIG. 10 or 11 may be updated by an operator server. For example, when a service to which a user subscribes is changed or a service that an operator can provide is changed, the value of EF_RAT in the UICC may be updated through a SMS-PP download (class-2 message) in an OTA update format transmitted from the operator server to the electronic device or a CAT_TP bearer independent protocol (BIP) procedure. For example, when EF_RAT is updated by the operator server, the electronic device may receive a SIM_REFRESH command transmitted from the operator server and may read EF_RAdT again.

According to various embodiments, when there is no EF_RAT in the UICC, the electronic device may store and use information corresponding to EF_RAT in a nonvolatile memory area of the electronic device. When the information corresponding to EF_RAT is stored in the nonvolatile memory area of the electronic device, if the information corresponding to EF_RAT is updated by the operator server, the electronic device may receive raw data corresponding to EF_RAT from the operator server, may parse the received raw data, and may update the information stored in the nonvolatile memory area.

A method for searching for a radio access technology (RAT) by an electronic device supporting a plurality of communication networks according to any one of various example embodiments may include: receiving a request to initialize a subscriber identity module (SIM) stored in a universal integrated circuit card (UICC); identifying whether the UICC includes information about a list of a wireless communication network service to which a user subscribes; and in response to identifying that the UICC includes the information about the list of the wireless communication network service to which the user subscribes, performing wireless communication network connection through at least one antenna module based on the information about the list of the wireless communication network service to which the user subscribes being included in the UICC.

According to various example embodiments, the method may further include: in response to identifying that the UICC includes the information about the list of the wireless communication network service to which the user subscribes, identifying the information about the list of the wireless communication network service to which a user subscribes included in the UICC; and performing wireless communication network connection for at least one wireless communication network service to which the user subscribes based on the identified information.

According to various example embodiments, the method may include performing the wireless communication network connection for the at least one wireless communication network service to which the user subscribes according to a preset priority.

According to various example embodiments, the information about the list of the wireless communication network service to which the user subscribes may be stored as an elementary file (EF) in the UICC.

According to various example embodiments, the information about the list of the wireless communication network service to which the user subscribes may include information corresponding to at least one communication network among a 2G communication network, a 3G communication network, a 4G communication network, and a 5G communication network.

A method for searching for a radio access technology (RAT) by an electronic device supporting a plurality of communication networks according to any one of various example embodiments may include: identifying occurrence of an event of connection to a second wireless communication network while being connected to a first wireless communication network through at least one antenna module; identifying whether a universal integrated circuit card (UICC) includes information about a list of a wireless communication network service to which a user subscribes; in response to identifying that the UICC includes the information about the list of the wireless communication network service to which the user subscribes, identifying whether the user subscribes to a wireless network communication service corresponding to the second wireless communication network based on the information about the list of the wireless communication network service to which the user subscribes being included in the UICC; and performing connection with the second wireless communication network through the at least one antenna module based on whether the user subscribes to the wireless network communication service corresponding to the second wireless communication network.

According to various example embodiments, the method may include maintaining connection with the first wireless communication network based on the wireless network communication service corresponding to the second wireless communication network not being enabled, in response to identifying whether the user subscribes to the wireless network communication service corresponding to the second wireless communication network.

According to various example embodiments, the method may include performing the connection with the second wireless communication network, in response to identifying whether the user subscribes to the wireless network communication service corresponding to the second wireless communication network.

According to various example embodiments, the information about the list of the wireless communication network service to which the user subscribes may be stored as an elementary file (EF) in the UICC.

According to various example embodiments, the information about the list of the wireless communication network service to which the user subscribes may include information corresponding to at least one communication network among a 2G communication network, a 3G communication network, a 4G communication network, and a 5G communication network.

Although 2G, 3G, 4G and 5G communication networks are illustrated in various example embodiments described above, these embodiments are not limited thereto. Instead, the foregoing various embodiments may be equally or similarly applied to a wireless communication network service (e.g., 6G) to be added after the 5G communication network.

The electronic device according to various embodiments may be one of various types of electronic devices. The electronic devices may include, for example, a computer device, a portable communication device (e.g., a smartphone), a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., a master device or a task performing device). For example, a processor of the machine (e.g., the master device or the task performing device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents.

What is claimed is:

1. An electronic device comprising:
   at least one antenna module including at least one antenna;
   a universal integrated circuit card (UICC) configured to store at least one piece of subscriber identity information; and
   at least one processor electrically connected to the UICC, wherein the at least one processor is configured to:
   receive a request to initialize a subscriber identity module (SIM) stored in the UICC;
   in response to receiving the request to initialize the subscriber identity module, identify whether a field exists in the UICC, wherein the field stores information about a list of wireless communication network services to which a user subscribes from among a plurality of wireless communication networks available to the electronic device; and
   in a case that the field exists, identify at least one wireless communication network service to which the user subscribes among the plurality of wireless communication networks available to the electronic device based on the information about the list, and control the electronic device to perform wireless communication network connection through the at least one antenna module based on the identified at least one wireless communication network service, without performing wireless communication network connection through one or more wireless communication network services not included in the list and available to the electronic device; and
   in a case that the field does not exist, control the electronic device to perform wireless communication network connection through the at least one antenna module to the plurality of wireless communication networks available to the electronic device based on a preset priority for the plurality of wireless communication networks.

2. The electronic device of claim 1, wherein the at least one processor is configured to:
   in response to identifying that the field includes the information about the list of the wireless communication network service to which the user subscribes, identify the information about the list of the wireless communication network services to which the user subscribes included in the field; and
   perform the wireless communication network connection for at least one wireless communication network service to which the user subscribes based on the identified information.

3. The electronic device of claim 2, wherein the at least one processor is configured to:
   control the electronic device to perform the wireless communication network connection for the at least one wireless communication network service to which the user subscribes according to the preset priority.

4. The electronic device of claim 1, wherein the information about the list of the wireless communication network service to which the user subscribes is stored as an elementary file (EF) in the UICC.

5. The electronic device of claim 1, wherein the information about the list of the wireless communication network service to which the user subscribes comprises information corresponding to at least one communication network among a 2G communication network, a 3G communication network, a 4G communication network, and a 5G communication network.

6. A method for searching for a radio access technology (RAT) by an electronic device supporting a plurality of communication networks, the method comprising:
receiving a request to initialize a subscriber identity module (SIM) stored in a universal integrated circuit card (UICC);
in response to receiving the request to initialize the subscriber identity module, identifying whether a field exists in the UICC, wherein the field stores information about a list of wireless communication network services to which a user subscribes from among a plurality of wireless communication networks available to the electronic device; and
in a case that the field exists, identifying at least one wireless communication network service to which the user subscribes among the plurality of wireless communication networks available to the electronic device based on the information about the list, and performing wireless communication network connection through at least one antenna module based on the identified at least one wireless communication network service, without performing wireless communication network connection through one or more wireless communication network services which is not included in the list and available to the electronic device; and
in a case that the field does not exist, controlling the electronic device to perform wireless communication network connection through the at least one antenna module to the plurality of wireless communication networks available to the electronic device based on a preset priority for the plurality of wireless communication networks.

7. The method of claim 6, further comprising:
in response to identifying that the field includes the information about the list of the wireless communication network services to which the user subscribes, identifying the information about the list of the wireless communication network services to which the user subscribes included in the field; and
performing wireless communication network connection for at least one wireless communication network services to which the user subscribes based on the identified information.

8. The method of claim 7, comprising:
performing the wireless communication network connection for the at least one wireless communication network service to which the user subscribes according to the preset priority.

9. The method of claim 6, wherein the information about the list of the wireless communication network service to which the user subscribes is stored as an elementary file (EF) in the UICC.

10. The method of claim 6, wherein the information about the list of the wireless communication network service to which the user subscribes comprises information corresponding to at least one communication network among a 2G communication network, a 3G communication network, a 4G communication network, and a 5G communication network.

11. An electronic device comprising:
at least one antenna module including at least one antenna;
a universal integrated circuit card (UICC) configured to store at least one piece of subscriber identity information; and
at least one processor electrically connected to the UICC,
wherein the at least one processor is configured to:
identify occurrence of an event related to connection to a second wireless communication network while being connected to a first wireless communication network through the at least one antenna module;
based on identifying occurrence of the event, identify whether a field exists in the UICC, wherein the field stores information about a list of wireless communication network services to which a user subscribes;
in response to identifying that the field exists, identify whether the user subscribes to a wireless network communication service corresponding to the second wireless communication network based on the information about the list of the wireless communication network service to which the user subscribes being included in the field;
based on identifying that the user subscribes to the wireless network communication service corresponding to the second wireless communication network, control the electronic device to perform subscriber authentication for the second wireless communication network and connection with the second wireless communication network through the at least one antenna module based on the result of the authentication;
based on identifying that the user does not subscribe to the wireless network communication service corresponding to the second wireless communication network, control the electronic device to maintain connection with the first wireless communication network without performing the authentication for second wireless communication network; and
based on identifying that the field does not exist, control the electronic device to perform the subscriber authentication for the second wireless communication network and connection with the second wireless communication network through the at least one antenna module based on the result of the authentication.

12. The electronic device of claim 11, wherein the first wireless communication network is one among a 2G communication network, a 3G communication network, and a 4G communication network, and the second wireless communication network is a 5G communication network.

13. The electronic device of claim 11, wherein the information about the list of the wireless communication network service to which the user subscribes is stored as an elementary file (EF) in the UICC.

14. The electronic device of claim 11, wherein the information about the list of the wireless communication network service to which the user subscribes comprises information corresponding to at least one communication network among a 2G communication network, a 3G communication network, a 4G communication network, and a 5G communication network.

15. A method for searching for a radio access technology (RAT) by an electronic device supporting a plurality of communication networks, the method comprising:
identifying occurrence of an event related to connection to a second wireless communication network while being connected to a first wireless communication network through at least one antenna module;
in response to identifying occurrence of the event, identifying whether a field exists in a universal integrated circuit card (UICC), wherein the field stores information about a list of wireless communication network services to which a user subscribes;

in response to identifying that the field exists, identifying whether the user subscribes to a wireless network communication service corresponding to the second wireless communication network based on the information about the list of the wireless communication network service to which the user subscribes being included in the field;

in response to identifying that the user subscribes to the wireless network communication service corresponding to the second wireless communication network, performing subscriber authentication for the second wireless communication network and connecting with the second wireless communication network through the at least one antenna module based on the result of the authentication;

in response to identifying that the user does not subscribe to the wireless network communication service corresponding to the second wireless communication network, maintaining connection with the first wireless communication network without performing the authentication for second wireless communication network; and in response to identifying that the field does not include the information about the list of the wireless communication network services to which the user subscribes, performing the subscriber authentication for the second wireless communication network and connecting with the second wireless communication network through the at least one antenna module based on the result of the authentication.

16. The method of claim 15, wherein first wireless communication network is one among a 2G communication network, a 3G communication network, and a 4G communication network, and the second wireless communication network is a 5G communication network.

17. The method of claim 15, wherein the information about the list of the wireless communication network service to which the user subscribes is stored as an elementary file (EF) in the UICC.

18. The method of claim 15, wherein the information about the list of the wireless communication network service to which the user subscribes comprises information corresponding to at least one communication network among a 2G communication network, a 3G communication network, a 4G communication network, and a 5G communication network.

* * * * *